(12) United States Patent
Hirai et al.

(10) Patent No.: US 6,567,617 B2
(45) Date of Patent: May 20, 2003

(54) PHOTOMETRY DEVICE WITH LIGHT AND COLORIMETRIC SENSORS

(75) Inventors: Isamu Hirai, Tokyo (JP); Yoshikazu Iida, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/845,299

(22) Filed: May 1, 2001

(65) Prior Publication Data

US 2001/0038753 A1 Nov. 8, 2001

(30) Foreign Application Priority Data

May 1, 2000 (JP) ........................................ 2000-131938
Aug. 8, 2000 (JP) ........................................ 2000-239412

(51) Int. Cl.[7] .............................. G03B 7/00; G03B 13/26
(52) U.S. Cl. ........................ 396/225; 396/121; 396/234
(58) Field of Search .......................... 396/65, 67, 121, 396/122, 123, 225, 233, 234

(56) References Cited

U.S. PATENT DOCUMENTS

| 5,021,818 A | 6/1991 | Satoh et al. |
| 5,596,387 A | 1/1997 | Takagi |
| 5,617,175 A | 4/1997 | Asakura et al. |
| 5,710,948 A | 1/1998 | Takagi |
| 5,987,265 A | 11/1999 | Iwasaki |
| 6,175,693 B1 * | 1/2001 | Iida .............................. 396/121 |

FOREIGN PATENT DOCUMENTS

| JP | 5-340804 | 12/1993 |
| JP | 6-160936 | 6/1994 |
| JP | 6-281994 | 10/1994 |
| JP | 7-84299 | 3/1995 |
| JP | 10253449 | 9/1998 |

* cited by examiner

Primary Examiner—Russell Adams
Assistant Examiner—Arthur A Smith
(74) Attorney, Agent, or Firm—Greenblum & Bernstein, P.L.C.

(57) ABSTRACT

A photometry device for a camera is provided with a normal light sensor, an exposure amount determining system, a plurality of colorimetric sensors that detect a color of the object using light passed through a photographing lens of the camera. The calorimetric sensors have spectral sensitivity characteristics that are different from each other. The photometry device further includes an external light sensor, a light source color compensation amount determining system, a light source effect compensation system, a colorimetry compensation amount determining system, and an exposure amount compensation system. In such a device, the light source color compensation amount determining system changes the light source color compensation amount in accordance with an object distance, or the magnification of the photographing lens.

30 Claims, 24 Drawing Sheets

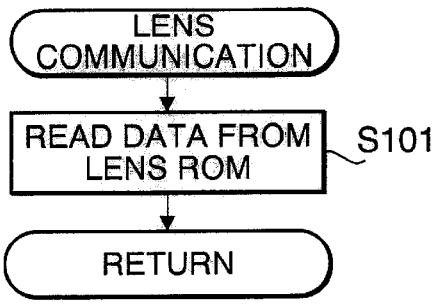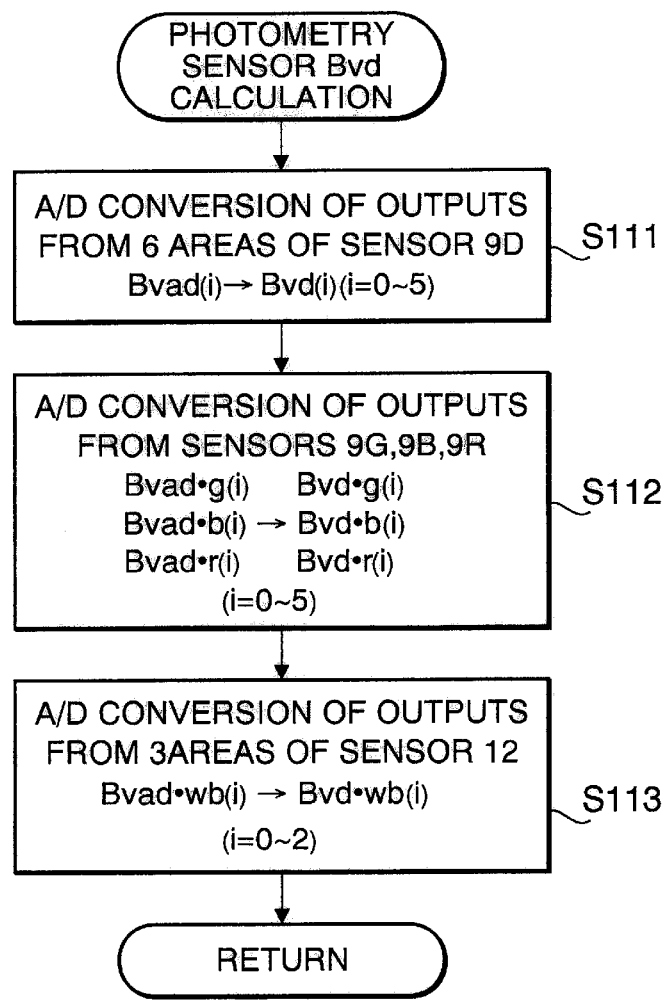

FIG.15A

MAGNIFICATION 1/M − Mv

| 1/M | 1 | 2 | 4 | 8 | 16 | 32 | 64 | 128 | 256 | 512 | 1024 | (TIMES) |
|---|---|---|---|---|---|---|---|---|---|---|---|---|
| Mv | 0 | 1 | 2 | 3 | 4 | 5 | 6 | 7 | 8 | 9 | 10 | |

LSC·f=1 ⟷ LSC·f=0

FIG.15B

FOCAL LENGTH f − fv

| f | 1 | 2 | 4 | 8 | 16 | 32 | 64 | 128 | 256 | 512 | 1024 | (mm) |
|---|---|---|---|---|---|---|---|---|---|---|---|---|
| fv | 0 | 1 | 2 | 3 | 4 | 5 | 6 | 7 | 8 | 9 | 10 | |

FIG.15C

DISTANCE D − Dv

| D | 0.7 | 1 | 1.4 | 2 | 2.8 | 4 | 5.6 | 8 | 11 | 16 | 22 | (m) |
|---|---|---|---|---|---|---|---|---|---|---|---|---|
| Dv | −1 | 0 | 1 | 2 | 3 | 4 | 5 | 6 | 7 | 8 | 9 | |

LSC·f=1 ⟷ LSC·f=0

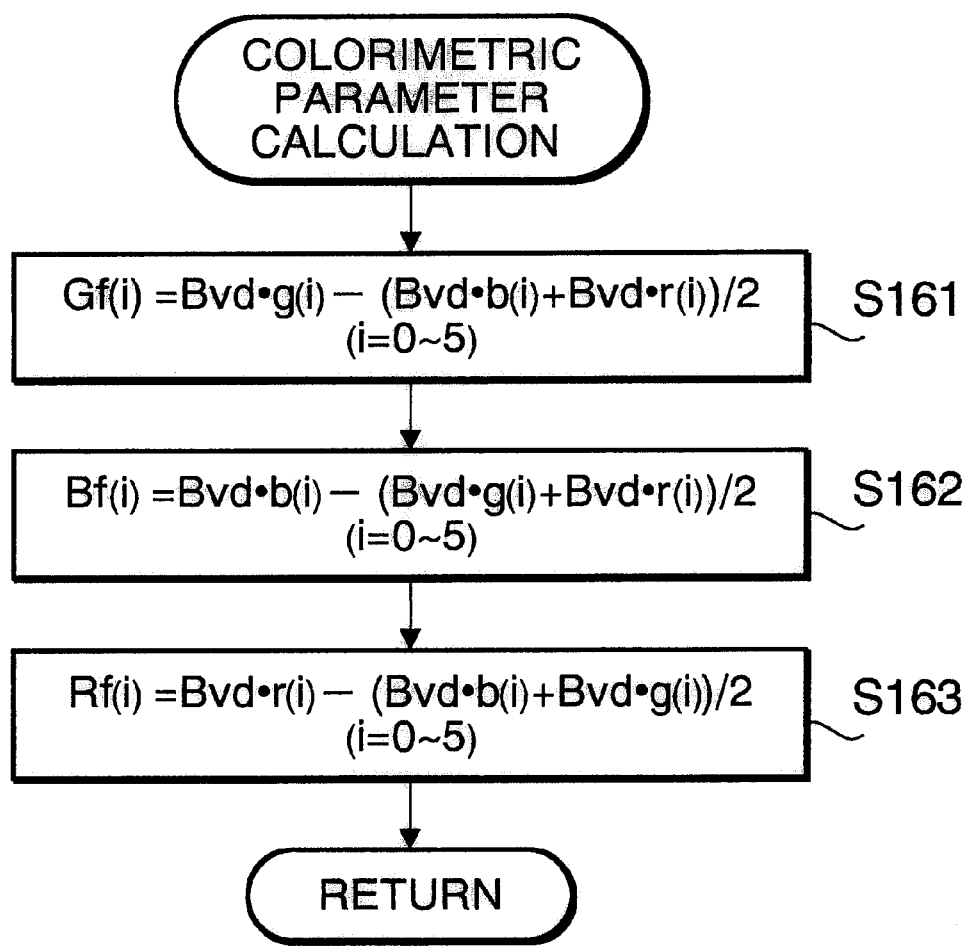

(EEPROM)

|  |  | THvalue | coefficient | CCcoefficient | CCadjustment |
|---|---|---|---|---|---|
| GREEN | g1 | 8 | 3/4 | 0 | 0 |
|  | g2 |  | 3/4 |  |  |
| BLUE | b1 | 8 | 3/4 | 2/16 | 2 |
|  | b2 |  | 3/4 |  |  |
| RED | r1 | 15 | 3/4 | 1/16 | 2 |
|  | r2 |  | 3/4 |  |  |
| MAGENTA | m1 | −40 |  | 0 | 0 |
| YELLOW | y1 | −9 |  | 1 | −4 |
| CYAN | c1 | −40 |  | 0 | 0 |

FIG.22

PHOTOMETRY DEVICE WITH LIGHT AND COLORIMETRIC SENSORS

BACKGROUND OF THE INVENTION

The present invention relates to a photometry device applicable to an SLR (Single Lens Reflex) camera, and more particularly to a photometry device with which exposure errors due to a difference of reflectivity of objects having different colors can be compensated.

Recently, in most of cameras, reflection type photometry devices are employed. The reflection type photometry device receives the light, which is reflected by an object and passed through an observing optical system of a camera, using a light receiving element, determines the brightness of the object based on the output of the measured value, and then calculates the exposure value of the camera based on the measured brightness. However, this type of the photometry device cannot detect the color of the object because of its structure. Accordingly, in such a device, the reflectivity of an object is generally assumed to be 18% and the exposure parameter is determined on this assumption. Therefore, regarding a whitish object whose reflectivity is greater than 18%, the determined brightness is greater than the actual brightness. If the camera controls an exposure operation based on the determined exposure value, the object is under exposed. A dark object whose reflectivity is less than 18% is measured to have a lower brightness. Therefore, such an object is over exposed. The difference of the reflectivity of the object may also occur depending on the color of the object.

For example, when the color of an object is yellow, the reflectivity maybe up to 70%. In such a case, if the standard reflectivity is assumed to be 18%, the exposure value is approximately 2 Ev lower than necessary. If the object color is blue, the reflectivity is approximately 9%. In this case, the object is over exposed by approximately 1 Ev greater than necessary.

Therefore, in the conventional photometry device, the photographer is required to guess the reflectivity of the object. Then, based on the reflectivity determined by the photographer, the exposure is controlled such that, if the object is a whitish or yellowish one having a relatively high reflectivity, it is to be overexposed, and if the object is a blackish or bluish one having a relatively low reflectivity, it is to be underexposed. With this operation, the above-described defects may be solved.

However, accurately guessing the reflectivity of the object and controlling the exposure can be done only by experienced and skilled photographers. It is impossible to require all the photographers to do such an operation. Further, it is not preferable that a manual operation of the photographer is required for exposure. Further, if such a manual operation is required, cameras become unsuitable for the recent trend of automatic photographing.

It may be possible to measure the color of the object, and perform exposure compensation based on the reflectivity corresponding to the measured color. If such a control is performed, an appropriate exposure value seems to be obtained automatically regardless of the color of the object. To perform such an operation, a plurality of photometry sensors for performing colorimetry may be provided inside the camera for selectively measuring different portions of the object, and a so-called TTL colorimetry may be performed. That is, light passed through a photographing lens of the camera is received by the plurality of sensors.

When such a structure is adopted, however, the spectral reflection characteristics of the object and the spectral radiant characteristic of an external light source are overlapped when the colorimetry is performed. Therefore, due to the spectral radiant characteristics of the external light source illuminating the object, it becomes difficult to measure the object color accurately. Then, the compensation amount of the exposure value includes errors, and the appropriate exposure may not be achieved.

It may be possible to measure the spectral radiant characteristic of the external light source independently, and compensate for the colorimetry result using the spectral radiant characteristic of the external light source. However, depending on photographing conditions, the spectral radiant characteristic of the external light source may not be measured accurately. For example, when a photographing magnification is relatively large, or a distance between the camera and an object is relatively small, as in a macro photographing, the light reflected by the object is also received by a photometry system for the external light source. In such a case, the colorimetry result cannot be compensated for correctly, and therefore, the appropriate exposure amount may not be determined.

SUMMARY OF THE INVENTION

It is therefore an object of the invention to provide an improved photometry device which optimizes the effectiveness of a light source compensation value, which is obtained based on the spectral radiant characteristic of an external light source, in accordance with a photographing condition, so that an exposure compensation amount is calculated in accordance with the colorimetric compensation value, and thereby appropriate exposure values can be obtained regardless of a difference of photographing conditions as well as the reflectivity of the object.

For the above object, according to the invention, there is provided a photometry device for a camera, which is provided with a normal light sensor that performs photometry with respect to an object, an exposure amount determining system that determines an exposure amount of the object in accordance with an output of the normal light sensor, a plurality of colorimetric sensors that detect a color of the object by performing colorimetry with respect to an image of the object which is formed by a photographing lens of the camera, the plurality of colorimetric sensors having spectral sensitivity characteristics that are different from each other, an external light sensor that measures an external light illuminating the object at spectral sensitivity characteristics respectively corresponding to the plurality of colorimetric sensors, a light source color compensation amount determining system that determines light source color compensation amount in accordance with the output of the external light sensor, a light source effect compensation system that compensates for the outputs of the colorimetric sensors in accordance with the light source color compensation amount, a colorimetry compensation amount determining system that determines a color of the object based on the output of the colorimetric sensors as compensated by the light source effect compensation system, and then determines a colorimetric compensation amount based on the determined color, an exposure amount compensation system that compensates for the exposure amount determined by the exposure amount determining system in accordance with the colorimetric compensation amount. In such a device, the light source color compensation amount determining system changes the light source color compensation amount in accordance with an object distance.

Alternatively, the light source color compensation amount determining system changes the light source color compensation amount in accordance with the magnification of the photographing lens.

Optionally, a predetermined fixed value is used as the light source color compensation amount if the photographing magnification exceeds a predetermined photographing magnification range or the object distance is smaller than a predetermined fixed distance.

Further optionally, a value intermediate the light source color compensation amount as determined by the light source color compensation amount determining system and a predetermined fixed value is used as the light source color compensation amount if the photographing magnification exceeds a predetermined photographing magnification range or the object distance is smaller than a predetermined fixed distance.

Further, the light source data corresponding to the output of the light source photometry system is stored in a storing system, and the fixed value is obtained in accordance with the data stored in the storing system.

Still optionally, a condition where the photographing magnification exceeds a predetermined photographing magnification range or the object distance is smaller than a predetermined fixed distance includes a condition where the camera operates in a macro photographing mode.

Further optionally, the normal light sensor and the plurality of colorimetric sensors meters light reflected by the object and passed through an optical system of the camera, and wherein the external light sensor receives light which is not passed through the optical system of the camera.

Furthermore, the normal light sensor includes a normal light photometry sensor, the spectral sensitivity characteristic of which has a peak sensitivity at a wavelength within a range from 500 nm through 600 nm, the plurality of colorimetric sensors include a blue light photometry sensor for metering blue light component, a green light photometry sensor for metering green light component, and a red light photometry sensor for metering red light component, and the external light sensor includes a photometry sensor having photometry areas for metering blue, green and red light components, respectively.

In this case, the light source effect compensation system may compensate for at least two of the outputs of the colorimetric sensors corresponding to three primary colors of green, blue and red in accordance with the light source color compensation amount.

Further, the plurality of calorimetric sensors and the normal light sensor may include photometric elements having the same photometric characteristics.

In this case, the green light sensor may be used as the normal light sensor, the output of the green light sensor being used as the output of the normal light sensor.

Optionally, each of the normal light sensor and the plurality of colorimetry sensors has divided photometry areas, the exposure amount determining system and exposure compensation amount determining system determining the exposure amount and the exposure compensation amount in accordance with the output of each of the divided photometry areas.

In this case, the colorimetric compensation amount determining system may judge the color of the object at each of the divided photometry areas, determine the colorimetric compensation amount for each of the divided photometry areas, and determine a colorimetric compensation amount with respect to an entire object based on the calorimetric compensation amounts for the divided photometry areas.

Alternatively, the colorimetric compensation amount determining system may determine a calorimetric compensation amount for each of the divided photometry areas, and add a colorimetric compensation amount for each of the photometry areas to the photometry output for each of the divided photometry areas.

BRIEF DESCRIPTION OF THE ACCOMPANYING DRAWINGS

FIG. 1 shows a perspective view of a camera employing a photometry device according to the invention;

FIG. 2 schematically shows main components of the camera shown in FIG. 1;

Figure 4A:
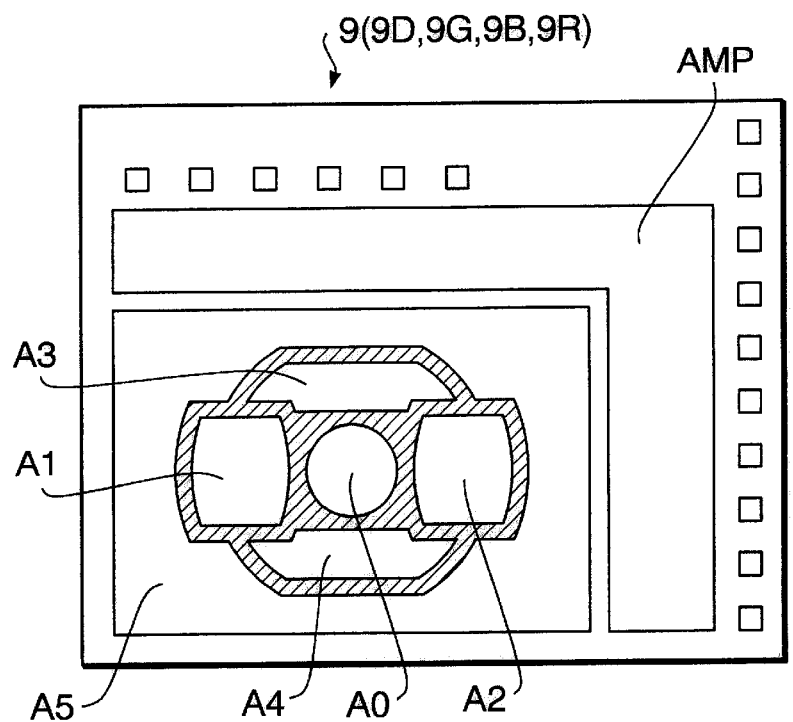
Figure 4B:
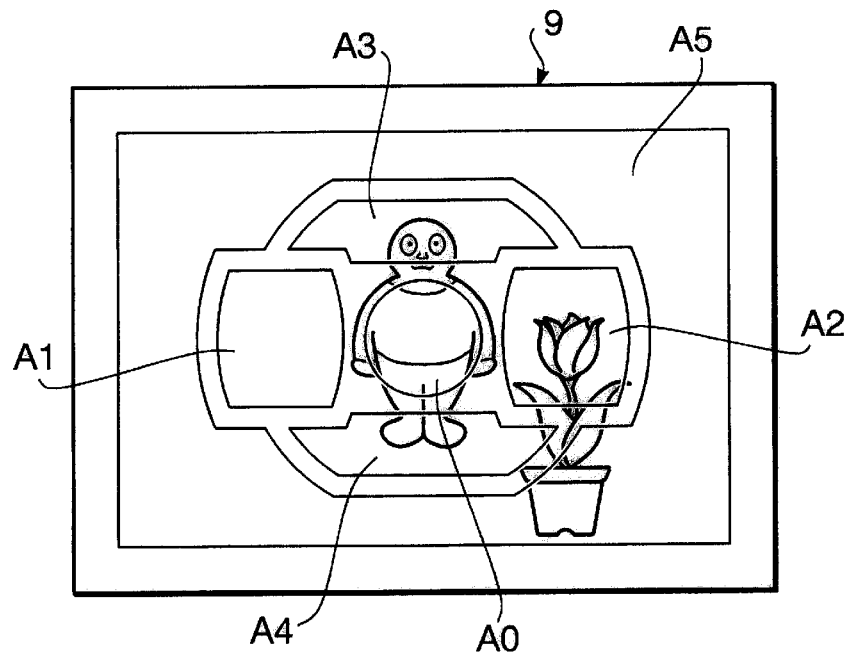
Figure 6:
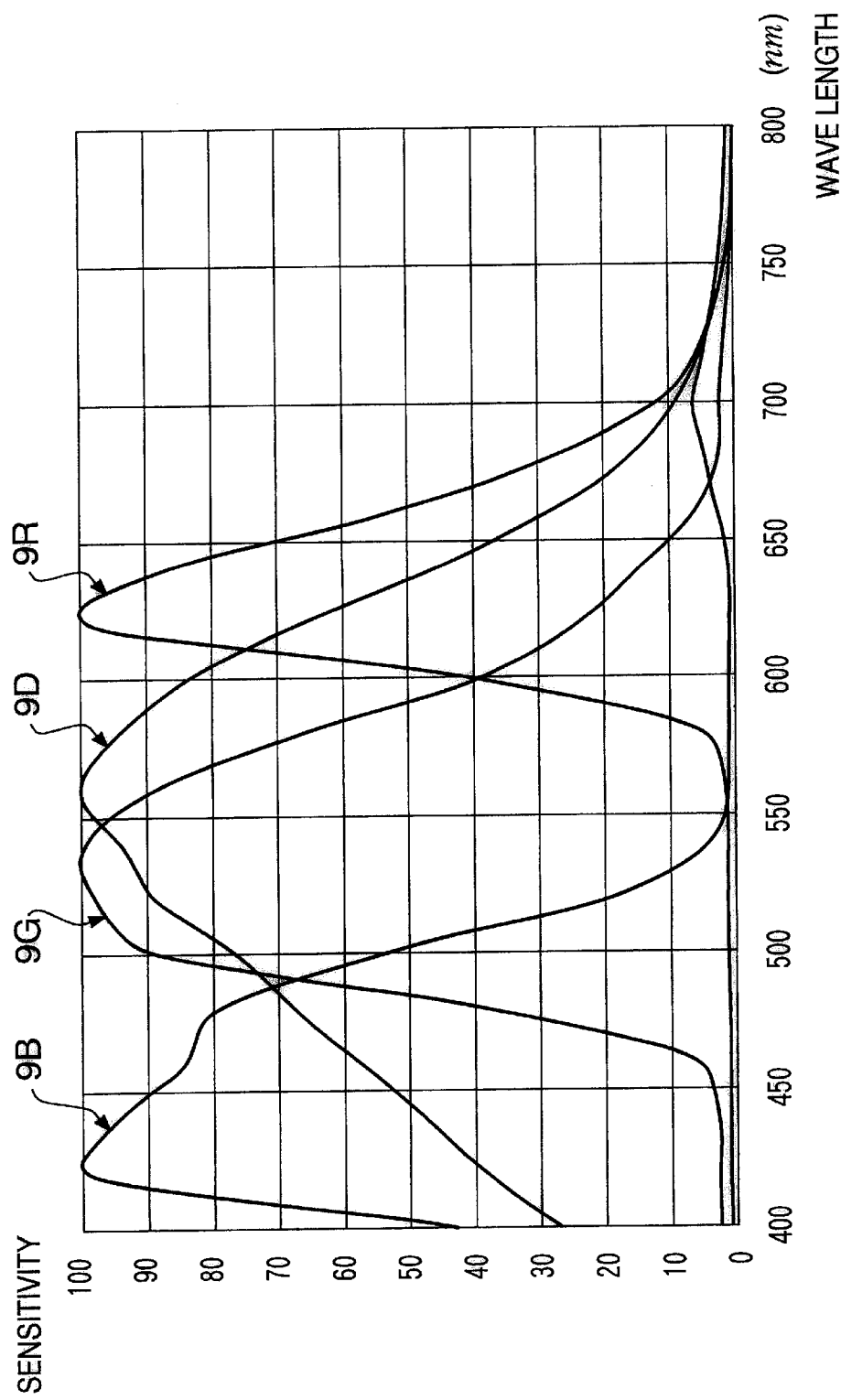
Figure 7:
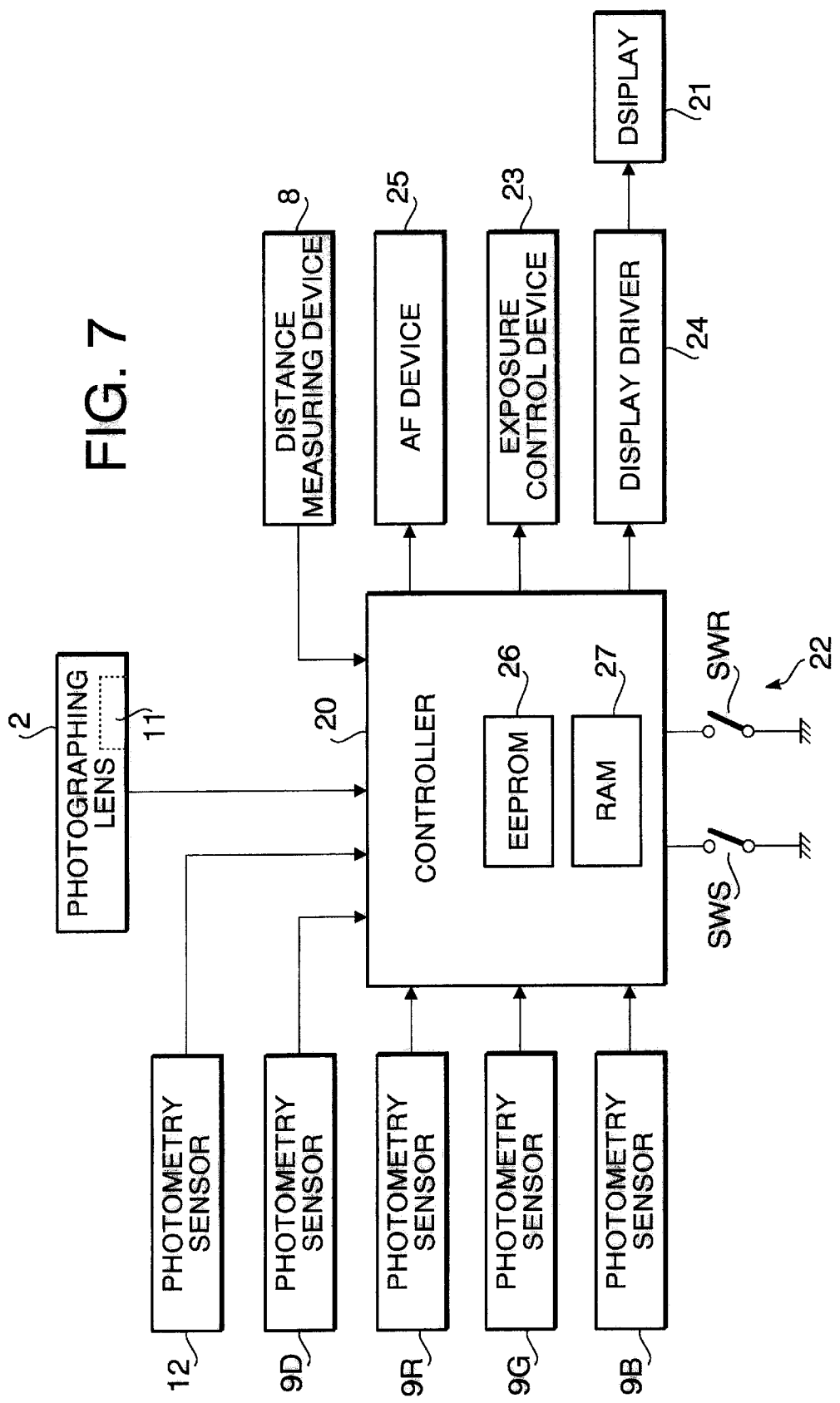
Figure 8:
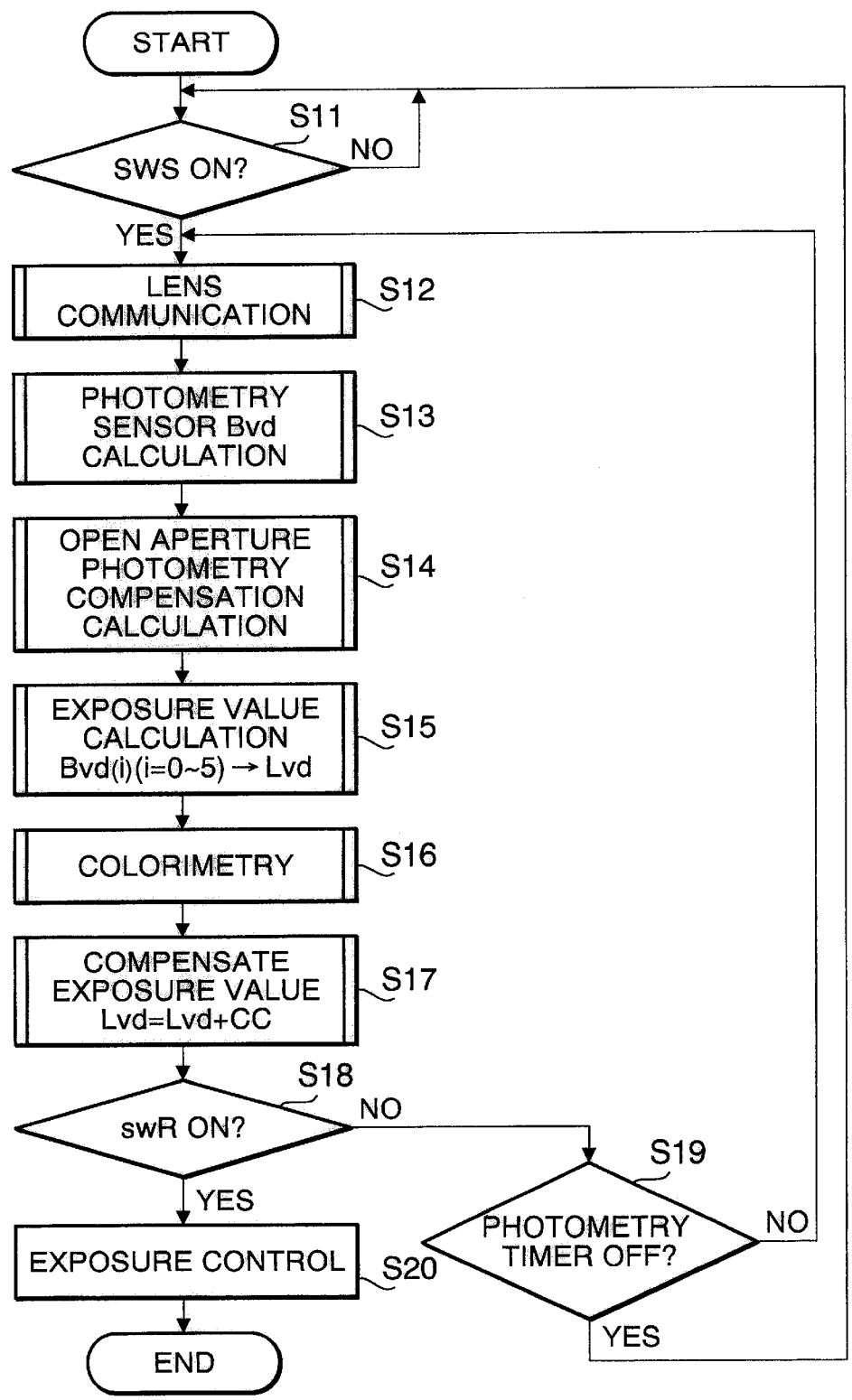
Figure 11:
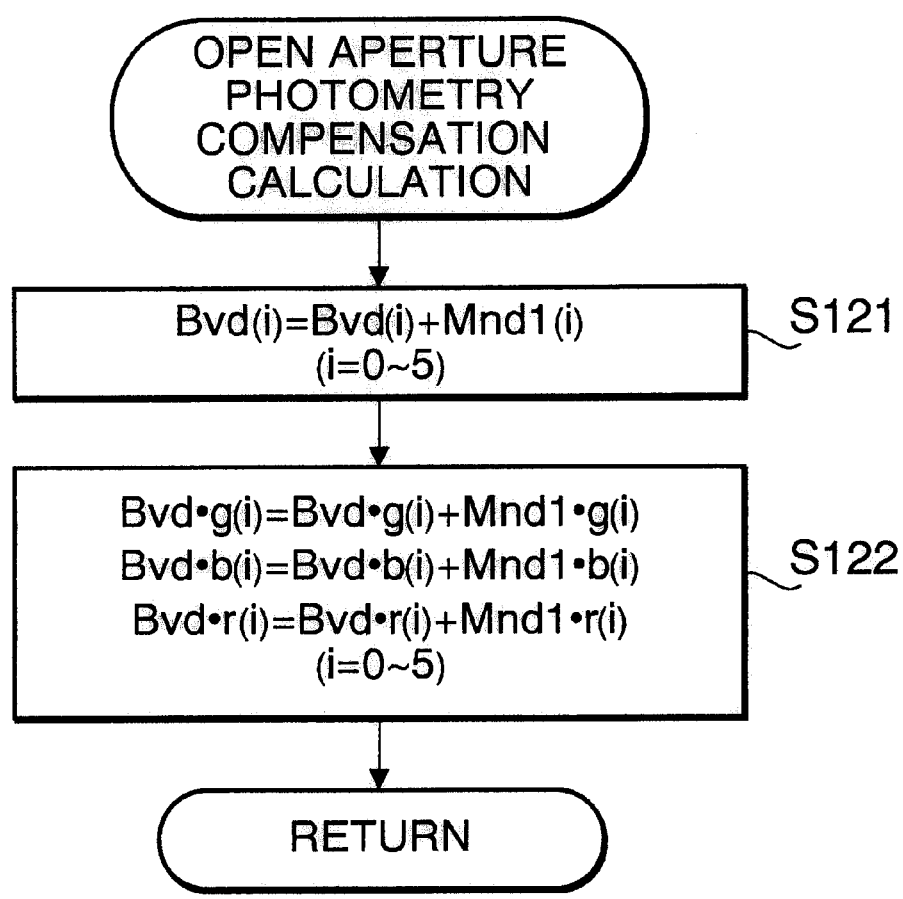
Figure 12:
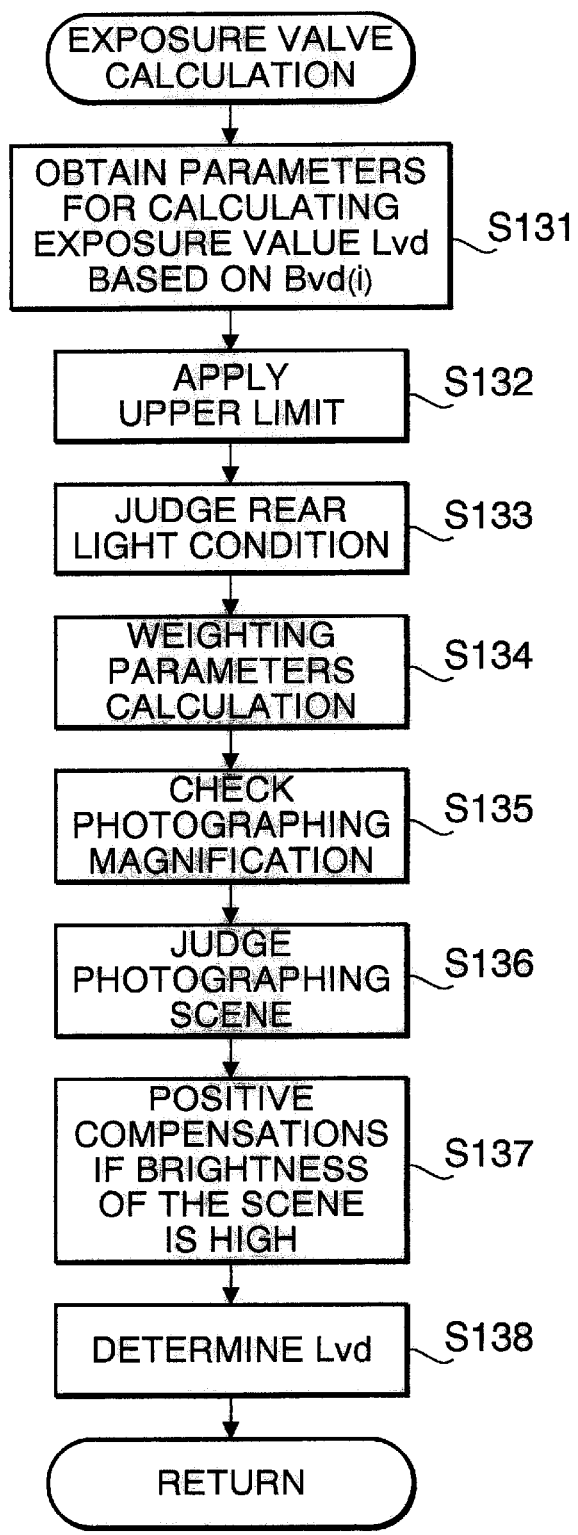
Figure 13:
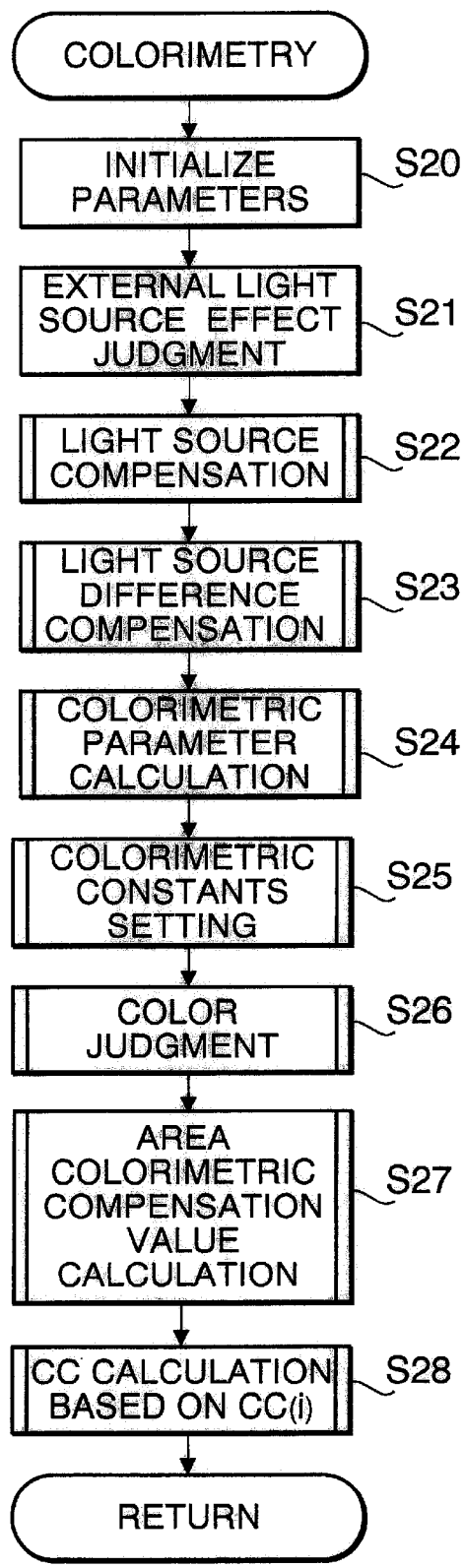
Figure 14:
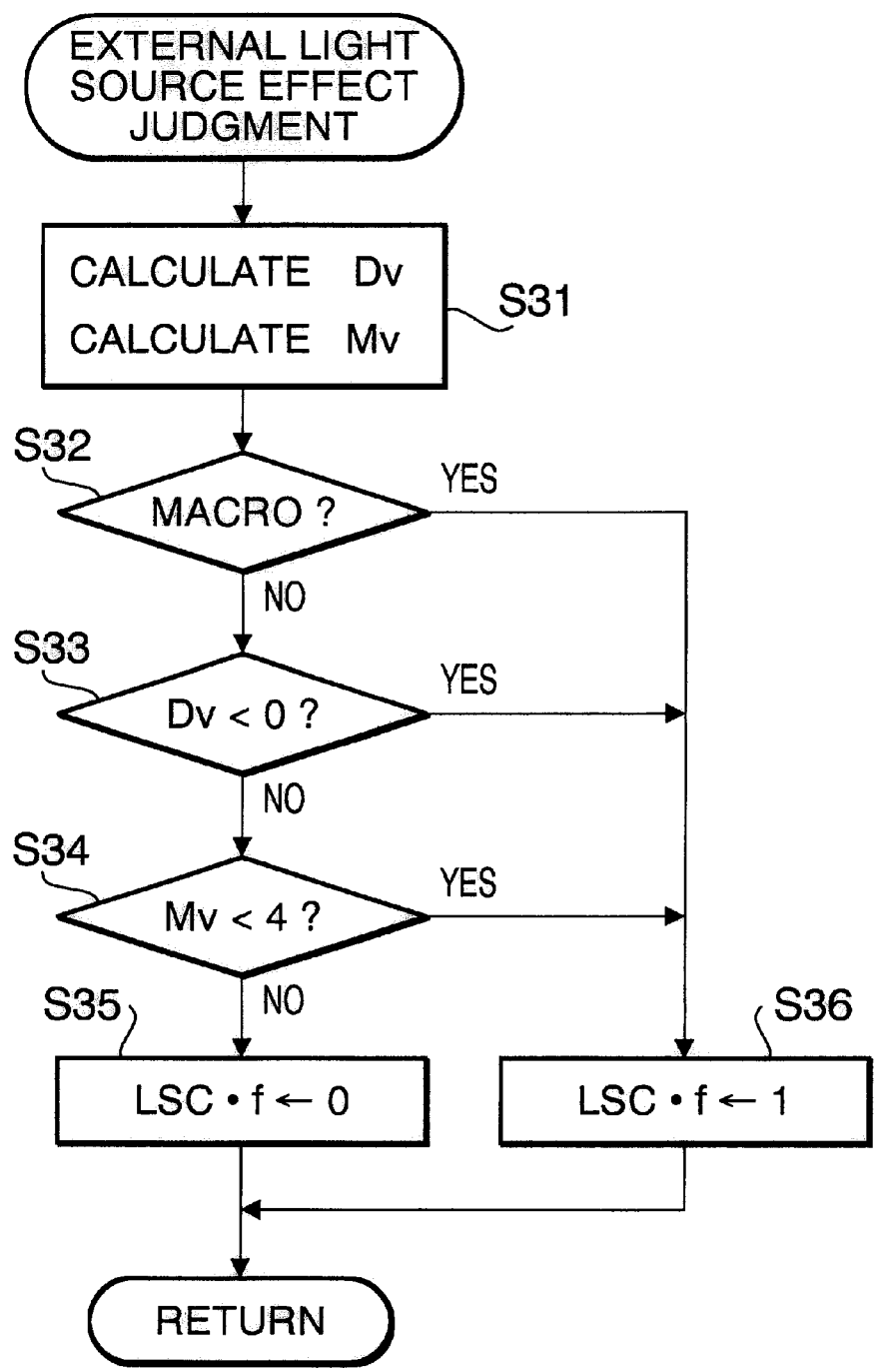
Figure 16:
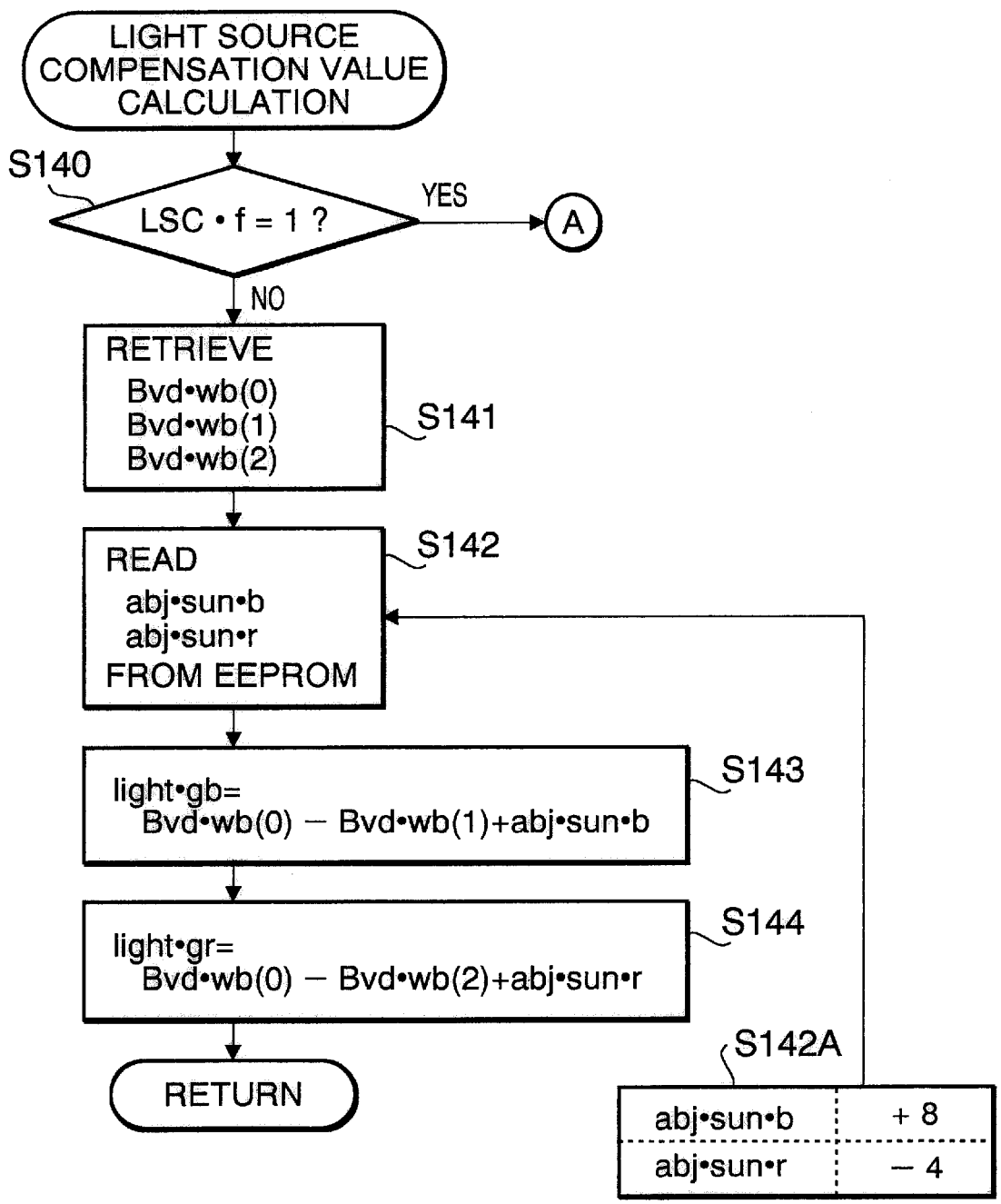
Figure 17:
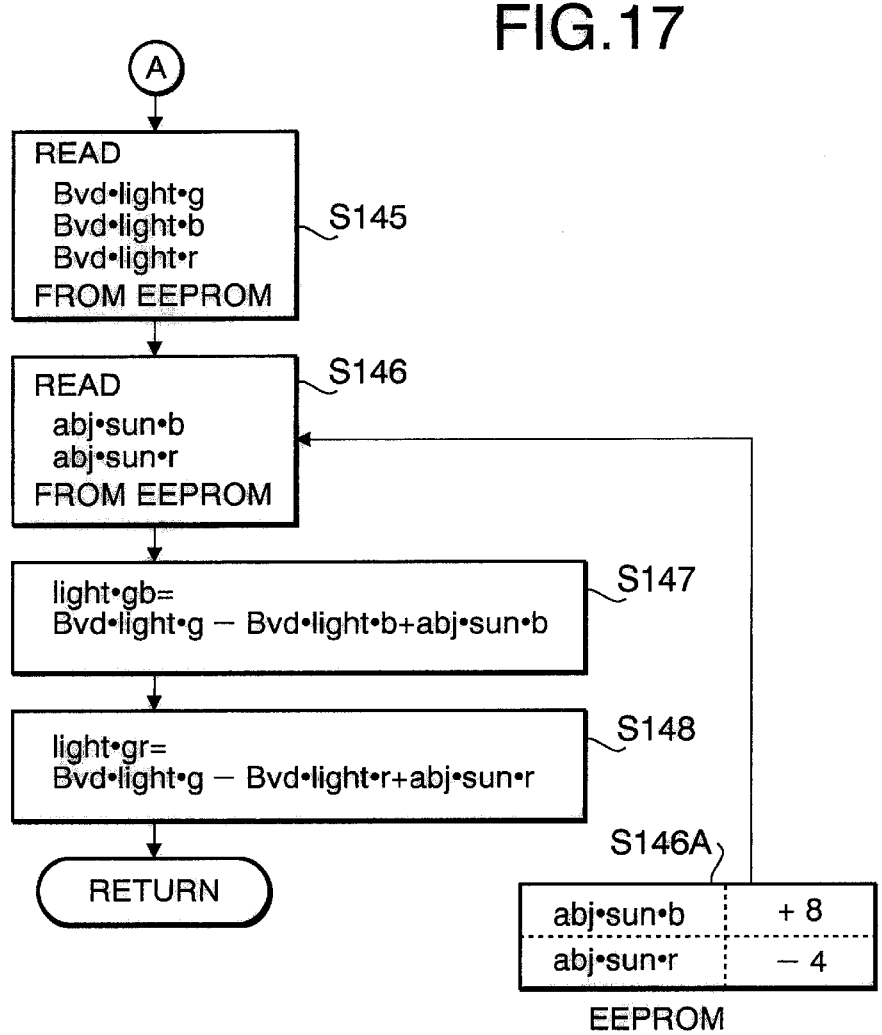
Figure 18:
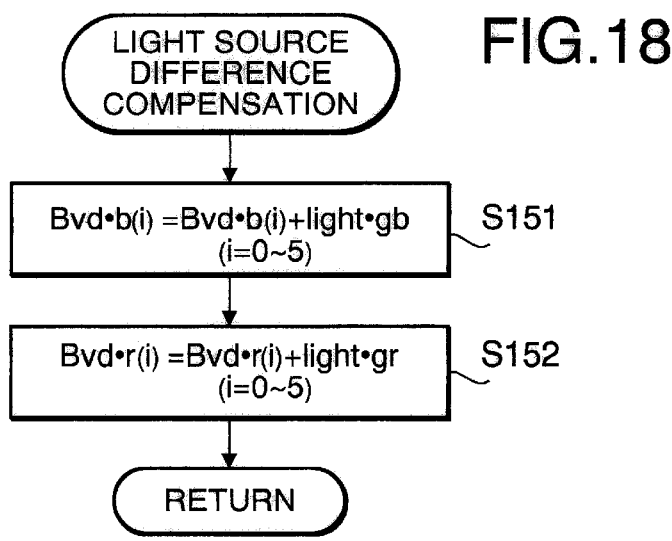
Figure 21:
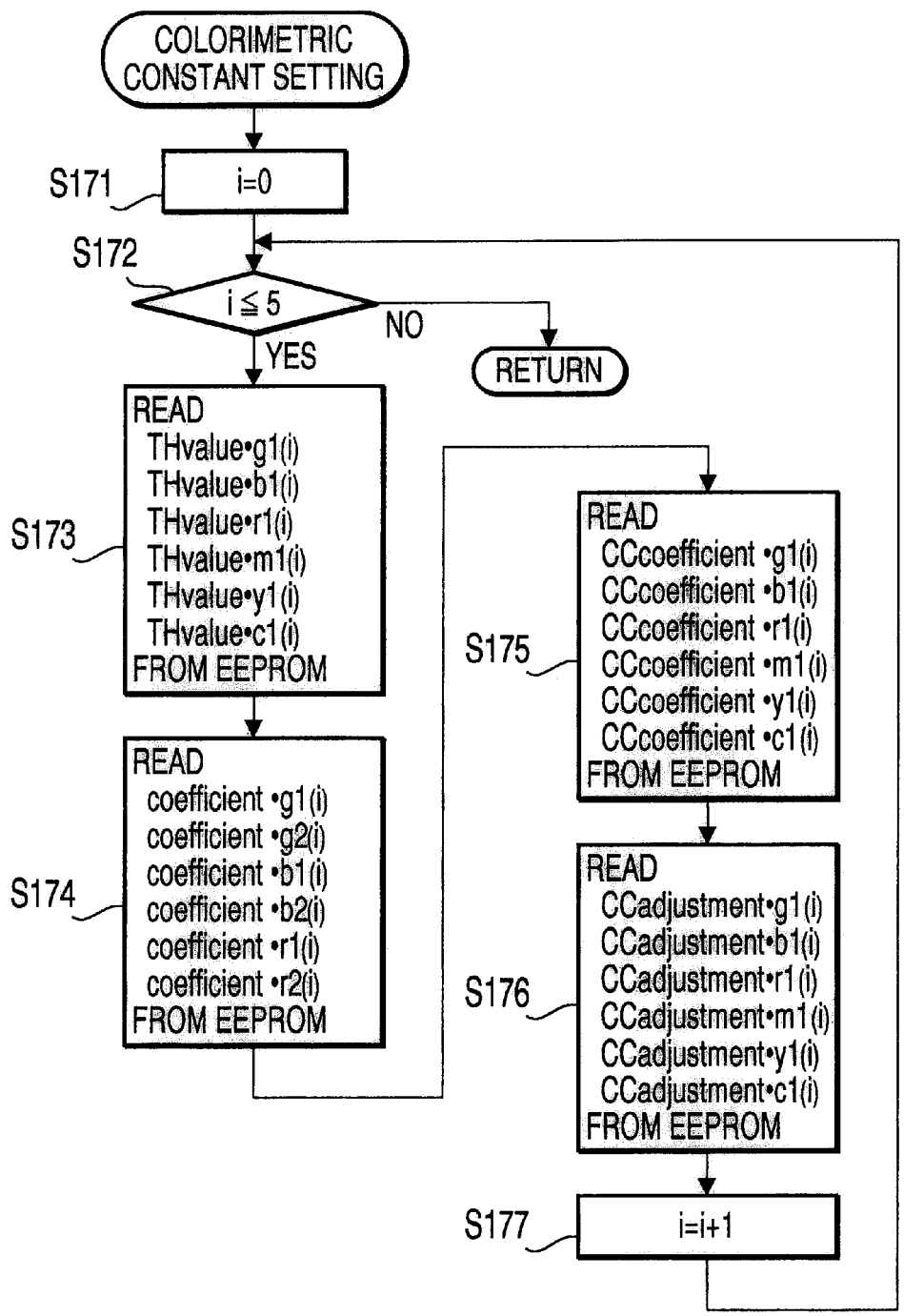
Figure 23:
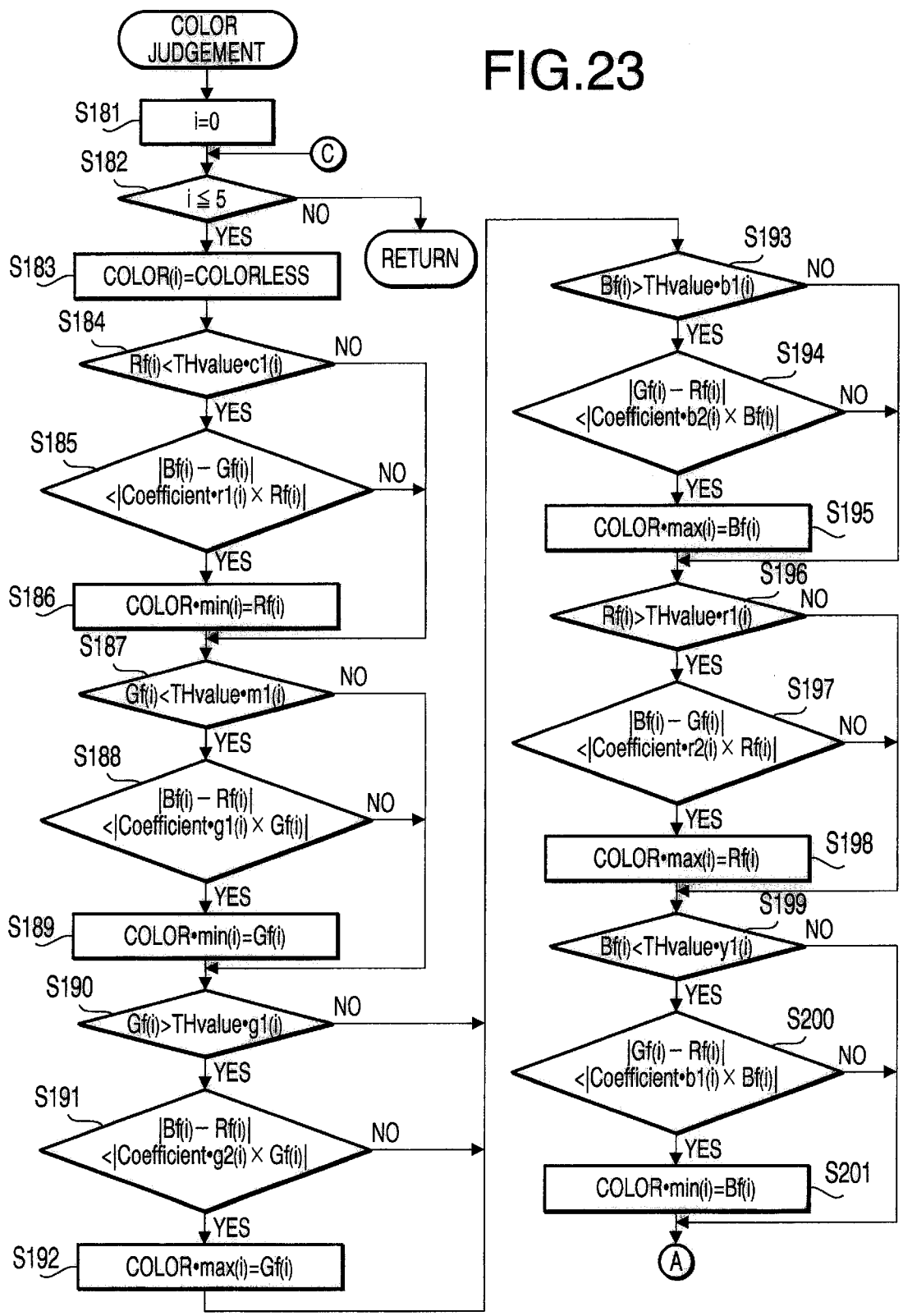
Figure 24:
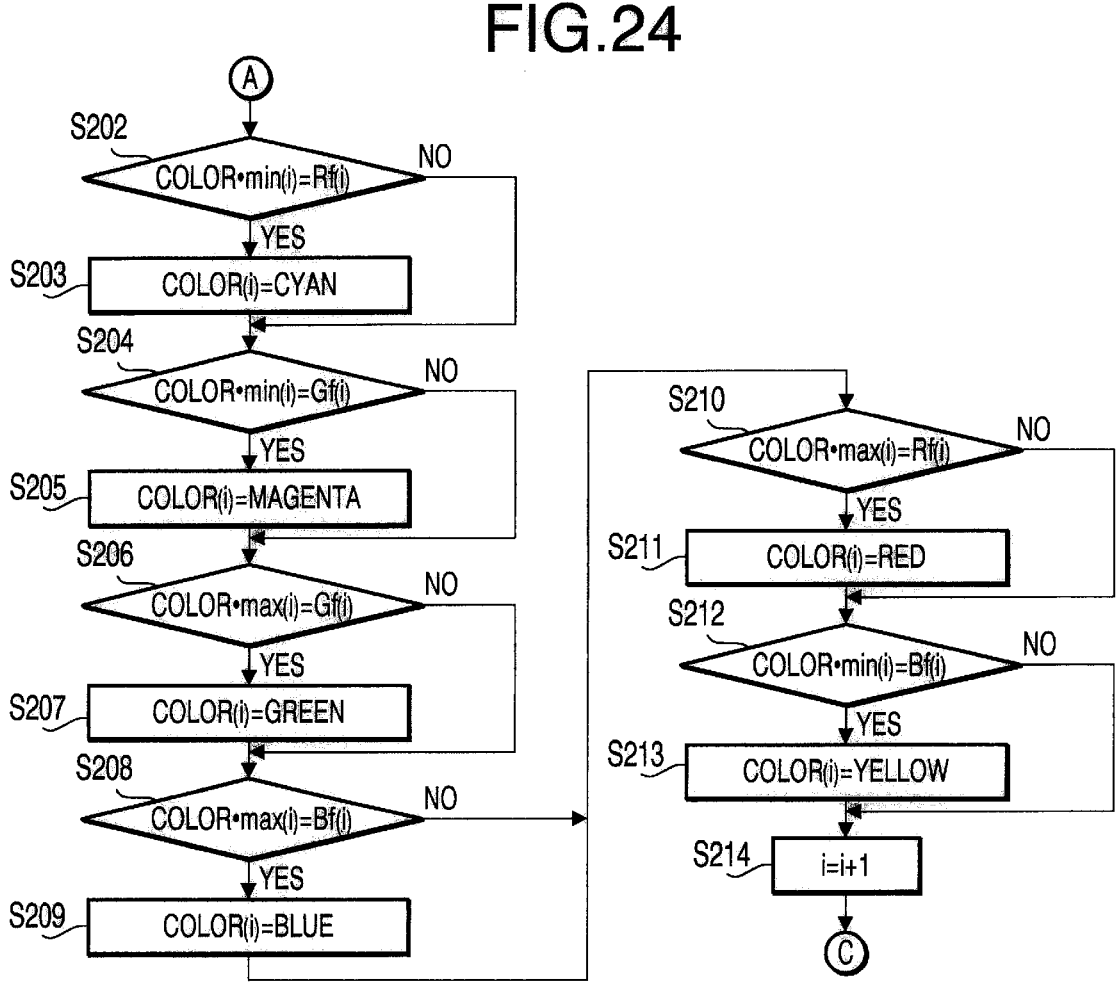
Figure 25:
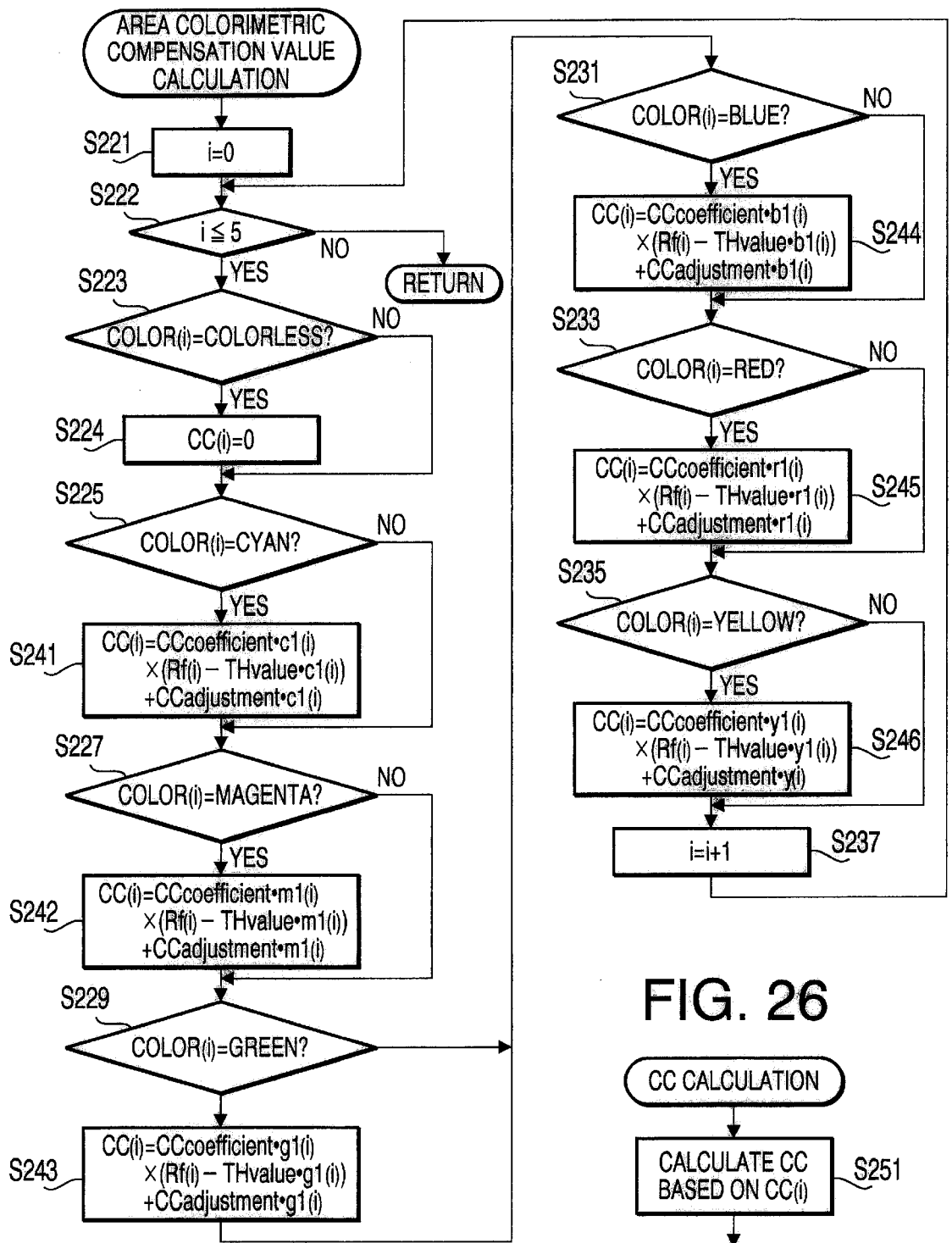
Figure 26:
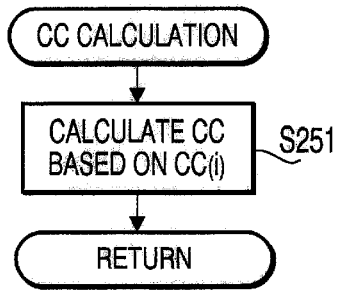

FIG. 4A schematically shows a structure of each of the photometry sensors;

FIG. 4B shows a relationship between the photometry areas of each photometry sensor;

FIGS. 5A–5D show a structure of a photometry sensor for a light source, and photometry and colorimetry sensors;

FIG. 6 shows spectral sensitivity characteristics of the green, blue and red light sensors;

FIG. 7 shows a block diagram of main portions of the camera;

FIG. 8 is a flowchart illustrating a main procedure of a photometry operation according to an embodiment;

FIG. 9 is a flowchart illustrating the "lens communication procedure";

FIG. 10 shows a flowchart illustrating the "photometry sensor Bvd calculation procedure";

FIG. 11 is a flowchart illustrating the "open aperture photometry compensation calculation procedure";

FIG. 12 is a flowchart illustrating an "exposure value calculation procedure";

FIG. 13 is a flowchart illustrating a "colorimetry procedure";

FIG. 14 is a flowchart illustrating an "external light source effectiveness determination" procedure;

FIGS. 15A–15C show tables indicating photographing magnification, focal lengths, photographing distances (object distances) and corresponding APEX values;

FIGS. 16 and 17 show a flowchart illustrating the "light source compensation procedure";

FIG. 18 is a flowchart illustrating the "light source difference compensation procedure";

FIGS. 19A–19F show exemplary spectral sensitivity characteristics of photometry sensors 9B, 9G and 9R;

FIG. 20 is a flowchart illustrating the "colorimetric parameter calculation procedure";

FIG. 21 is a flowchart illustrating the "colorimetric constant setting procedure";

FIG. 22 shows an example of constants read from the EEPROM;

FIGS. 23 and 24 show a flowchart illustrating the "color judgment procedure";

FIG. 25 shows an example of the "area colorimetric compensation value calculation procedure"; and FIG. 26 is a flowchart illustrating a "CC calculating procedure", which is called at S28 of the main procedure.

DESCRIPTION OF THE EMBODIMENTS

Hereinafter, referring to the accompanying drawings, an embodiment according to the present invention will be described.

Figure 1:
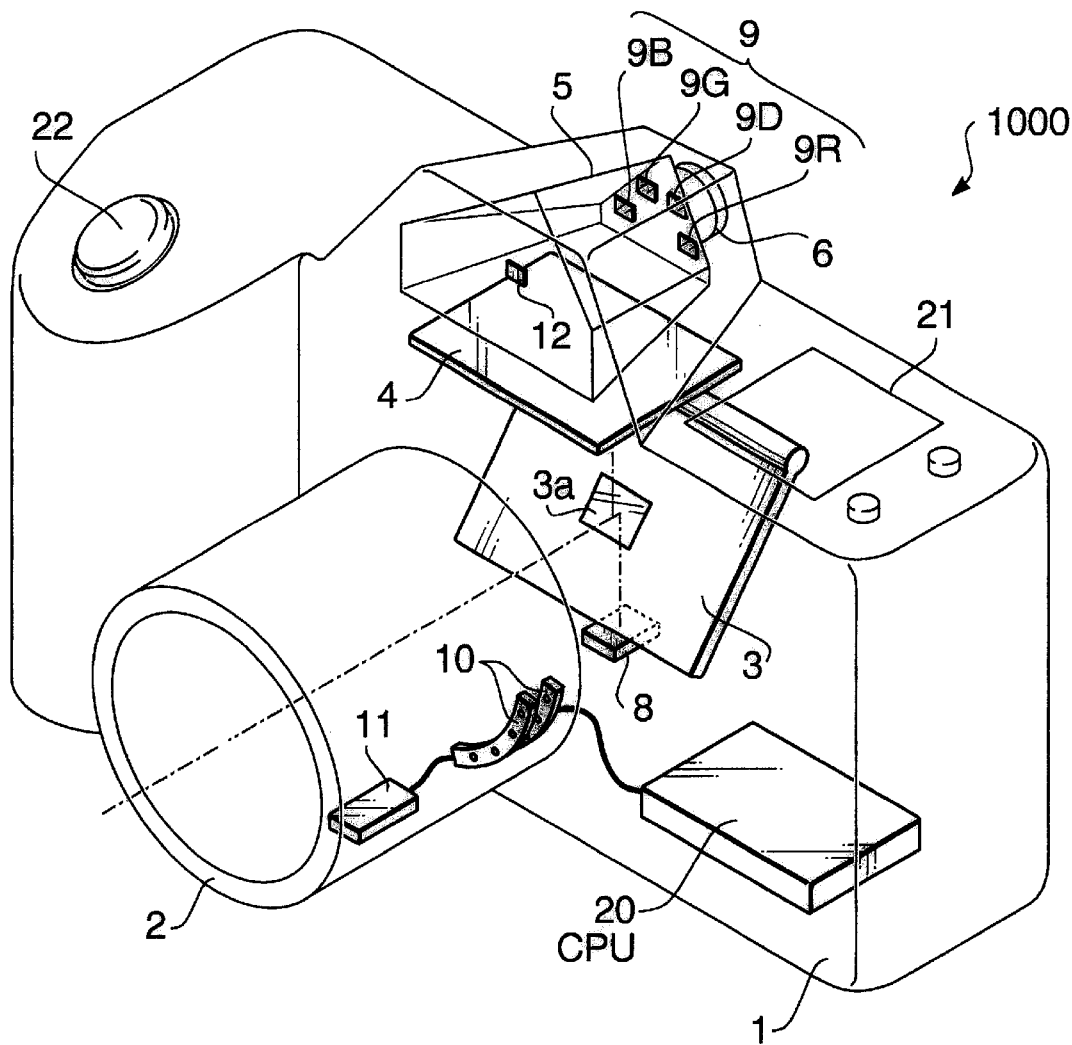
Figure 2:
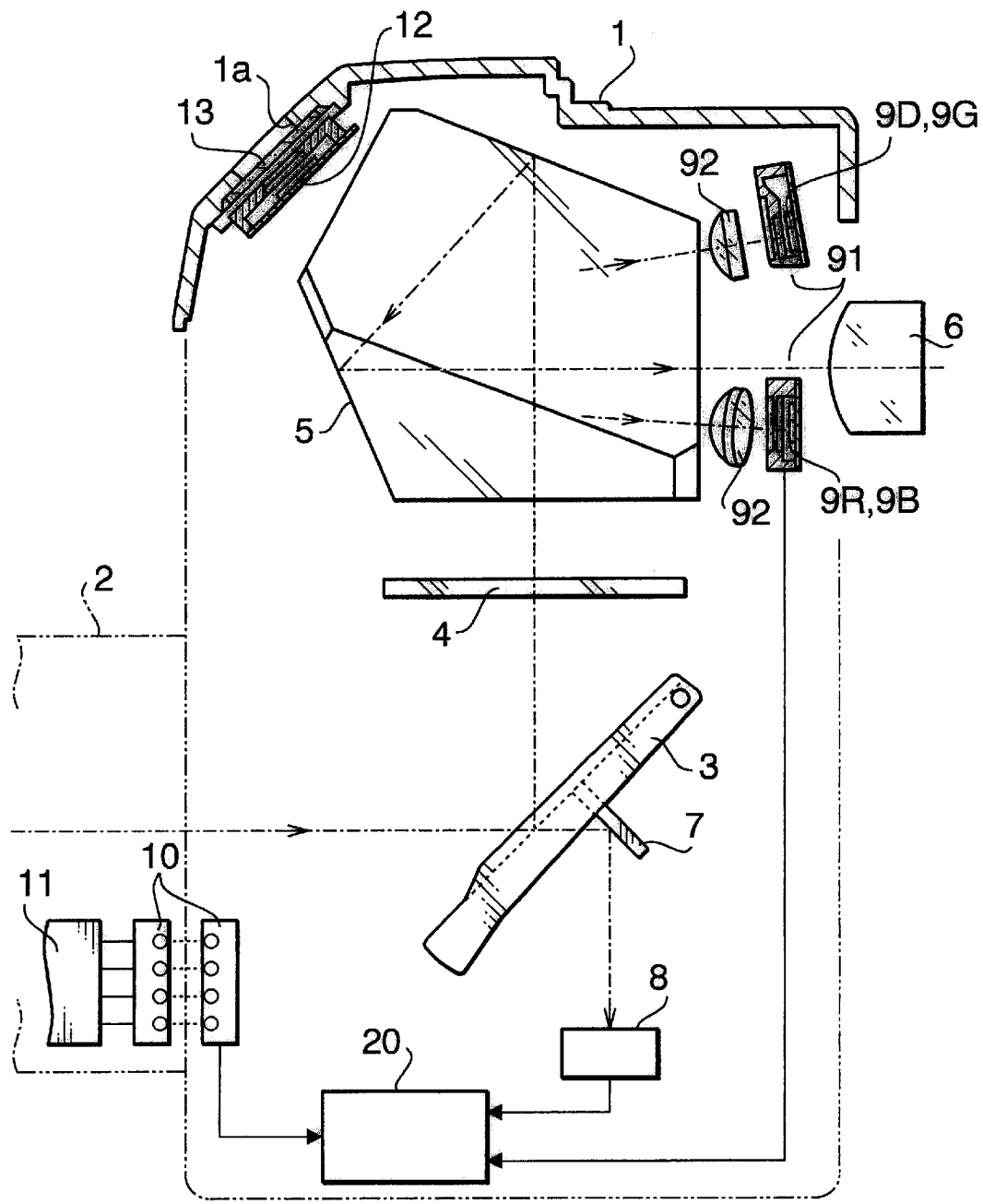

FIG. 1 shows a perspective view of a camera 1000 employing a photometry device according to the invention, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a distance measuring device 8.

The distance measuring device 8 is used for an AF (Automatic focusing) control. On the rear side of the pentagonal prism 5, four photometry sensors 9 (9D, 9R, 9G and 9B) are provided (see FIGS. 1 and 2), each of which functions as a photometry element and receives part of light passed through the photographing lens 2. Based on the outputs of the photometry sensors 9, a photometry operation for determining exposure parameters is executed. On an upper front portion of the camera body 1, a window 1a is formed, and a photometry sensor 12 for receiving light passed through the window 1a is provided, with a milky-white diffusing plate 13 being located therebetween. The external light entered through the window 1a is diffused by the diffusing plate 13 and measured by the photometry sensor 12.

The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 are provided. Furthermore, inside the camera body 1, various mechanisms such as a film winding mechanism are provided. However, such mechanisms are conventionally known, and description thereof will be omitted for the sake of the simplicity.

Figure 3A:
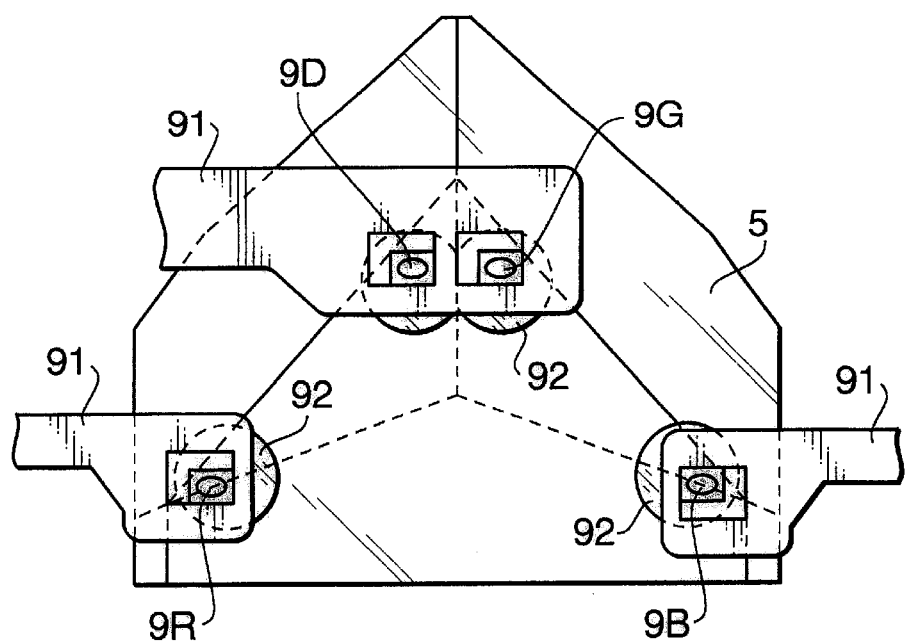
FIG. 3A shows an arrangement of photometry sensors.

FIG. 3A shows a rear view of the pentagonal prism 5. As shown in FIG. 3A, the four photometry sensors 9 includes sensors 9D and 9G provided at an upper central portion on the eyepiece side of the pentagonal prism 5, and sensors 9B and 9R provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, a collective lens 92 is provided to form an object image on each of the sensors 9D, 9G, 9B and 9R.

FIG. 4A schematically shows a structure of each of the sensors 9D, 9G, 9B and 9R. As shown in FIG. 3A, each sensor 9 (9D, 9G, 9B or 9R) is constructed as a planar structure photometry IC chip that is configured such that a light receiving section and an amplifier AMP are integrally formed. The light receiving section includes six photometry areas, i.e., a central area A0, a left area A1, a right area A2, an upper area A3, a lower area A4, and a peripheral area A5.

FIG. 4B shows a relationship between the photometry areas A0–A5 and portions of an object. The photometry areas A0–A5 of each sensor receives the light from respective portions of an object as indicated in FIG. 4B. The photometry sensor 9G is provided with a green filter GF on its light receiving surface (see FIG. 5B), and receives a green component of light, the photometry sensor 9B is provided with a blue filter BF on its light receiving surface (see FIG. 5C), and receives a blue component of light, and the photometry sensor 9R is provided with a red filter RF on its light receiving surface (see FIG. 5D), and receives a red component of light. In this embodiment, the three sensors 9G, 9B and 9R are used as colorimetry elements. Spectral sensitivity characteristics of the sensors 9G, 9B and 9R respectively provided with the green, blue and red filters GF, BF and RF are indicated in FIG. 6. The sensors 9G, 9B and 9R have peaks in sensitivity at approximately 530 nm, 420 nm, and 630 nm, respectively. The remaining sensor 9D is not provided with a color filter. It should be noted, however, that the spectral sensitivity characteristic of the sensor 9D has its peak within a wavelength range of 500–600 nm, which is close to the visual sensitivity characteristic. The sensor 9D is used as a normal light detecting sensor.

Figure 5C:
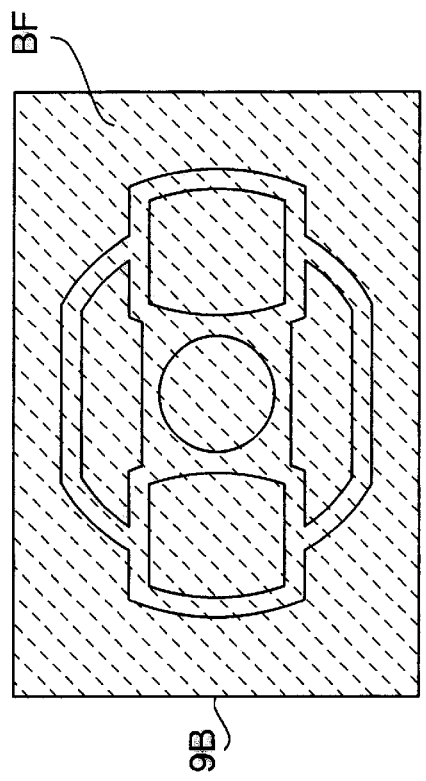
Figure 5D:
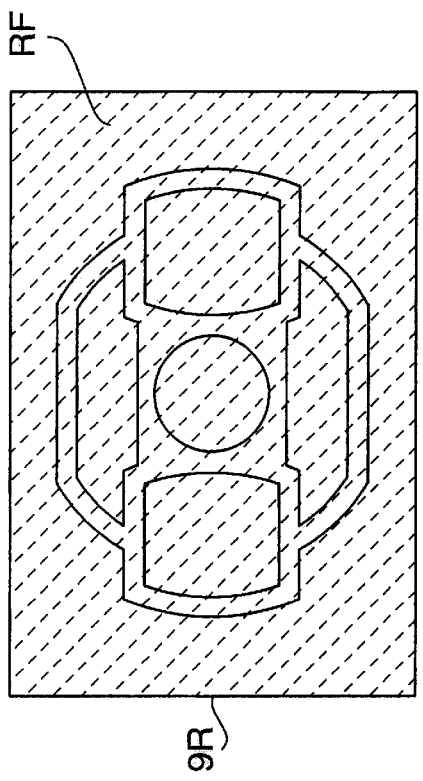
Figure 5A:
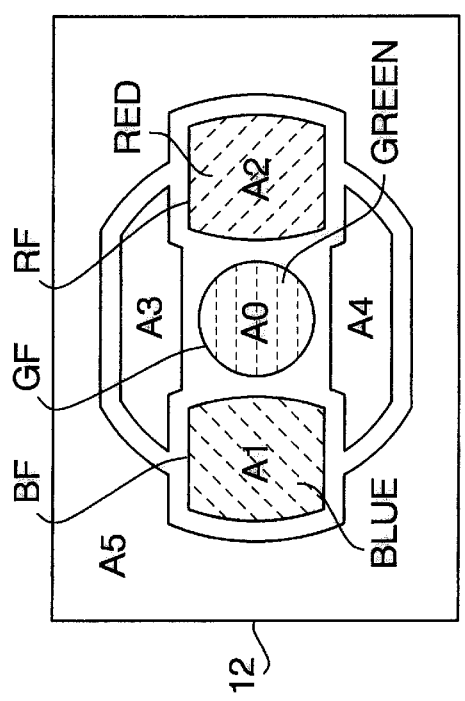
Figure 5B:
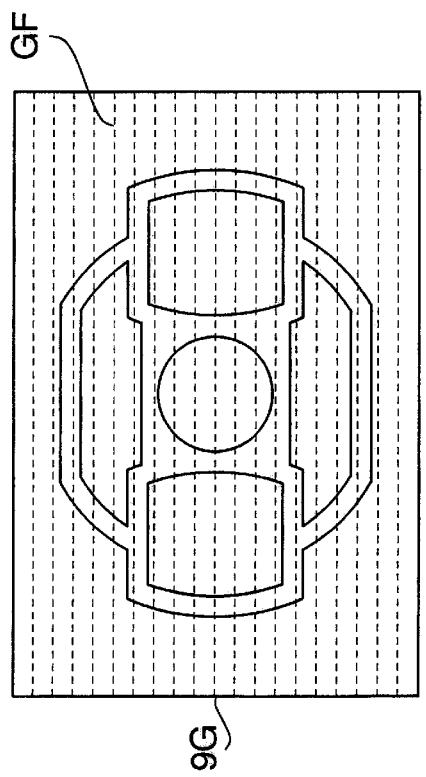

As shown in FIG. 5A, the photometry sensor 12 is formed of the same IC chip as the sensors 9. Among the photometry areas A0–A5 of the photometry sensor 12, however, only the areas A0, A1 and A2 are used. Further, a green filter GF is provided in front of the area A0, a blue filter BF is provided in front of the area A1, and a red filter RF is provided in front of the area A2. The filters GF, BF and RF provided to the photometry sensor 12 have the same spectral transmissivity characteristics as the filters provided to the photometry sensors 9G, 9B and 9R, respectively. With this configuration, the areas A0, A1 and A2 of the photometry sensor 12 receive green, blue and red components of the external light illuminating the object, respectively. Since all the photometry sensors are formed of the same IC chip, the spectral sensitivity, output characteristics and the like are substantially the same. Further, since the same IC chip is used, manufacturing cost can be reduced. Further, since the same filters are used for the areas A0–A2 of the photometry sensor 12 and the photometry sensors 9G, 9B and 9R, respectively, the spectral sensitivity characteristics of these sensors are substantially identical, respectively.

FIG. 7 shows a block diagram of main portions of the camera 1000. The four sensors 9D, 9G, 9B and 9R output values indicative of quantity of received light (components) to the controller 20, respectively. From the photometry sensor 12, photometry values for green, blue and red components of the external light are output. Further, the output (i.e., a distance value) of the distance measuring device 8 is input to the controller 20, which controls the AF device 25 to perform the automatic focusing operation.

Furthermore, the controller 20 is connected with a photometry switch SWS and a shutter-release switch SWR. The photometry switch SWS is ON when the release button 22 is half depressed. The shutter-release switch SWR is ON when the shutter button is fully depressed. When the shutter button is depressed halfway and the photometry switch SWS is turned ON, the controller 20 performs a photometry calculation in accordance with a predetermined algorithm, and calculates an exposure value. Then, the controller 20 controls the exposure control device 23 in accordance with the calculated exposure value to perform a photographing operation. Further, the controller 20 drives a display driver 24 to display the calculated exposure value on the LCD pane 121. It should be noted that the controller 20 includes an EEPROM 26 storing various values necessary for the photometry calculation (which will be described in detail later), and a RAM 27 for temporarily storing various pieces of data.

An operation of the photometry device will be described hereinafter.

FIG. 8 is a flowchart illustrating a main procedure of a photometry operation. When the release button 22 is half depressed and the photometry switch SWS is ON (S11: YES), a "lens communication procedure" is performed (S12) so that the controller 20 receives data intrinsic to the photographing lens 2 currently mounted onto the camera body 1. Specifically, the data intrinsic to the photographing lens 2 includes an open f-number, a focal length of the photographing lens 2 and the like, which may affect the photometry calculation. The data is transmitted from a lens ROM 11 of the photographing lens 2 to the controller 20 through the electrical contacts 10. Then, a "photometry sensor output Bvd calculation procedure" is executed (S13). In this procedure, the photometry sensors 9 (9D, 9G, 9B and 9R) output analog photometry values which are obtained by receiving light through the photographing lens 2, the quick return mirror 3, and the pentagonal prism 5. Then, the analog values are converted into digital brightness values Bvd which can be used in the operation executed by the controller 20. Then, based on the brightness value Bvd obtained at S13 and the lens data intrinsic to the photographing lens 2 retrieved at S12, an "open aperture photometry compensation calculation procedure" is executed (S14) to compensate for errors depending on individual photographing lenses.

At S15, an "exposure value calculation procedure" is executed. In this procedure, based on the brightness value Bvd, which is obtained in accordance with the output of the photometry sensor 9D for normal light, an exposure value Lvd is calculated. In this procedure, parameters for calculating the exposure value Lvd in accordance with photographing conditions, e.g., a rear light condition, a magnification and/or scene of photographing, are obtained. Then, based on the parameters, the exposure value Lvd is calculated.

At S16, based on the brightness value Bvd obtained by each of the sensors 9R, 9B and 9G for the RGB (Red, Green and Blue) color components and the brightness values obtained by the photometry sensor 12, a "colorimetry procedure" is executed. Specifically, based on the brightness values output by the photometry sensor 12, compensation values for compensating errors of the output values of the sensors 9R, 9B and 9G due to the color of the external light are determined. Then, based on the compensation values, the brightness values Bvd obtained by the photometry sensors 9R, 9G and 9B are compensated. Then, based on the compensated brightness values Bvd, the color of the object is determined, and a colorimetric compensation value CC is calculated based on the determined color of the object. In S17, an "exposure value colorimetric compensation procedure" is executed, where the exposure value Lvd obtained at S15 is compensated based on the calorimetric compensation value CC.

At S18, if the shutter-release switch SWR is ON (S18: YES), the exposure control device 23 controls the exposure operation at S20 in accordance with the exposure value Lvd obtained at S17 to execute a photographing operation. If the shutter-release switch SWR is OFF, controls goes to S19, where it is detected whether a photometry timer is OFF.

If the photometry timer is ON (i.e., if a predetermined period has not elapsed) (S19: NO), control proceeds to S12, and the foregoing procedures are repeated. If the photometry timer is OFF (i.e., if the predetermined period has elapsed) (S19: YES), control proceeds to S11.

FIG. 9 is a flowchart illustrating the "lens communication procedure", which is called at S12 of the main procedure shown in FIG. 8.

In the lens communication procedure, the controller 20 accesses the lens ROM 11 through the electrical contacts 10, and reads the data intrinsic to the photographing lens 2 stored in the lens ROM 11 (S101). The data is stored in the RAM 27 of the controller 20, and control returns. Items included in the data intrinsic to the photographing lens 2 include, for example, a lens type, lens data, the shortest focusable distance, a focusable range, a focal length of the photographing lens, an exit pupil position, an open f-number, an aperture efficiency and the like. In this embodiment, the controller 20 reads the data from the ROM 11 and stores the same in the RAM 27.

FIG. 10 shows a flowchart illustrating the "photometry sensor Bvd calculation procedure", which is called at S13 in the main procedure shown in FIG. 8.

In this procedure, data Bvad(i) (where, i=0, 1, . . . , 5) which represents A/D converted output voltages (analog data) of the photometry areas Ai (i=0, 1, . . . , 5) shown in FIG. 4A of the photometry sensor 9D for normal light are obtained. Further, data Bvad·g(i), Bvad·b(i) and Bvad·r(i) which represent A/D converted values of the output voltages of the photometry areas Ai (i=0, 1, 2, . . . 5) of each of the sensors 9G, 9B and 9R for color components are obtained. Then, the A/D converted values Bvad(i) of the sensor 9D output are adjusted to brightness values Bvd(i) (S111). The A/D converted values Bvad·g(i), Bvad·b(i) and Bvad·r(i) (i=0, 1, 2, . . . 5) are also adjusted to the brightness values Bvd·g(i), Bvd·b(i) and Bvd·r(i), respectively (S112). Further, the A/D converted values Bvad·wb(i) (where i=0, 1 and 2), which represent the outputs from the areas A0–A2 of the photometry sensor 12, respectively, are adjusted to the brightness values Bvd·wb(i), respectively (S113).

FIG. 11 is a flowchart illustrating the "open aperture photometry compensation calculation procedure" which is called at S14 of the main procedure shown in FIG. 8.

At S121, an open aperture photometry compensation value Mnd1(i) is calculated based on the focal length, the exit pupil position, the open f-number and the aperture efficiency stored in the RAM 27. Compensation values mv1, mv2, mv3 and mv4 for compensating for shift amounts with respect to the reference photometry values due to the individual differences of the optical characteristics of the cameras, and the focal length, the exit pupil position, the open aperture and the aperture efficiency, are determined. Then, the sum of the compensation values mv1+mv2+mv3+mv4 is obtained, which is referred to as the open aperture compensation value Mnd1(i). Following the similar procedure, the open aperture compensation values Mnd1·g(i), Mnd1·b(i), and Mnd1·r(i) are calculated. Then the open aperture compensation value Mnd1(i) is added to the brightness value Bvd(i), and then the sum is determined as a new brightness value Bvd(i). Thus, the following calculation is executed at S121:

$$Bvd(i)=Bvd(i)+Mnd1(i).$$

Similar to the above, with respect to the brightness values Bvd·g(i), Bvd·b(i) and Bvd·r(i) obtained by the photometry sensors 9G, 9B and 9R, open aperture photometry compensation values Mnd1·g(i), Mnd1·b(i) and Mnd1·r(i) are added to obtain newly defined brightness values (S122). That is:

$$Bvd\cdot g(i)=Bvd\cdot g(i)+Mnd1\cdot g(i).$$
$$Bvd\cdot b(i)=Bvd\cdot b(i)+Mnd1\cdot b(i).$$
$$Bvd\cdot r(i)=Bvd\cdot r(i)+Mnd1\cdot r(i).$$

As a result, each brightness value is free from the affect of the individual differences of photographing lenses 2 when coupled to the camera body 1.

FIG. 12 is a flowchart illustrating an "exposure value calculating procedure", which is called at S15 of the main procedure.

In the "exposure value calculating procedure", the brightness values Bvd(i) are compensated in accordance with a photographing condition to obtain an appropriate exposure value Lvd. Specifically, in the "exposure value calculating procedure", the brightness values Bvd(i) (where i=0–5) corresponding to the photometry areas A0–A5 are compared with each other, or the brightness of the object as a whole is detected, and a condition of the object to be photographed (e.g., photographing with rear light, photographing at dusk, or photographing at night) is determined. Then, based on the determined condition, the brightness values Bvd(i) are weighted, or one of the brightness values Bvd(i) is selected and then the exposure value Lvd suitable to the photographing condition is determined. Then, based on the brightness values Bvd(i), parameters for calculating the exposure value Lvd are calculated at S131. Then, the upper brightness limit of a parameter is calculated (S132), compensation value for the rear light is calculated (S133), weighting parameters are calculated (S134), a photographing magnification M is checked (S135), a photographing scene is judged (S136), a positive compensation value for a high brightness photographing scene is calculated (S137), and the exposure value Lvd is calculated based on the calculated parameters and the brightness values Bvd(i) (S138).

FIG. 13 is a flowchart illustrating a "colorimetry procedure" called at S16 of the main procedure.

In the "colorimetry procedure", the color of the object is detected, and a calorimetric compensation value CC is calculated in accordance with the detected color of the object.

At S20, colorimetric parameters are initialized (i.e., set to initial values). Depending on the color temperature of a light source illuminating the object, the calorimetric value varies. In S21, an "external light source effect examining procedure" is executed to determine the degree of effects of the external light source with respect to an object. Since the colorimetry results may differ depending on the color temperature of the external light source, i.e., depending on the spectral radiant characteristic of the light source, at S22, a "light source compensation procedure" is executed to obtain compensation values for canceling the effects of the color temperature of the light source. At S23, a "light source difference compensation procedure" is executed using the compensation values obtained at S22. At S24, a "colorimetric parameter calculation procedure" for obtaining calorimetric parameters, which will be used for execution of a "calorimetric calculation procedure", is executed. At S25, a "calorimetric constant setting procedure" is executed to set constants used for color measurement. At S26, a "color judgment procedure" for judging a color based on the parameters and constants obtained in the preceding steps is executed.

At S27, an "area colorimetric compensation value calculating procedure" is executed for calculating colorimetric compensation values CC(i) for the photometry areas A0–A5 in accordance with the judged color. At S28, a CC calculating procedure for calculating a calorimetric compensation value CC for an entire object in accordance with the calorimetric compensation values CC(i) for the respective photometry areas is executed.

At S17 (see FIG. 8), the exposure value Lvd obtained at S15 is compensated based on the colorimetric compensation value CC as a whole to obtain a final exposure value Lvd. That is, the final exposure value Lvd is calculated by the formula below:

$$Lvd = Lvd + CC.$$

Next, steps S21–S28 shown in FIG. 13 will be described in further detail.

In the "external light source effect examining procedure" at S21, the effects of the external light on the object is examined. That is, if the distance between the camera and the object is relatively small, or the photographing magnification is relatively large, the reflectivity characteristic (or the color) of the object has effects on the photometry value detected by the photometry sensor 12. In such a case, it is not necessary to calculate a compensation value for canceling the effect of the external light source metered by the photometry sensor 12 based on the photometry value detected by the photometry sensor 12. Rather, it is preferable to use a predetermined fixed value as the compensation value related to the light source. The "external light source effect examining procedure" is a pre-process to be executed before the compensation value related to the light source is determined.

FIG. 14 is a flowchart illustrating the "external light source effect examining procedure".

Firstly, based on a focal length of the photographing lens 2 mounted on the camera 1000 and the minimum focusable distance, which have been retrieved from the lens ROM 11 in a preceding procedure, and data related to the photographing distance which is obtained from a code plate (not shown) provided in the photographing lens 2, a photographing distance APEX value Dv and a photographing magnification APEX value Mv are calculated (S31). The photographing distance APEX value Dv is defined as follows.

$$Dv = 2 \cdot \log_2 D,$$

where D represents the photographing distance (unit: meter).

FIG. 15C shows the values of D and corresponding APEX values. It should be noted that the photographing distances, in particular, those at a near range, are different between photographing lenses having different focal lengths. Therefore, in order to standardize, the APEX value Dvmin of the minimum photographing distance Dmin, which is retrieved from the photographing lens, is referred to, and the photographing distance APEX value Dv is compensated using the minimum photographing distance APEX value Dvmin. With this operation of standardization, the photographing distance APEX value Dv is used regardless whether the photographing lenses whose photographing distances at the near range are different or zoom lenses are mounted to the camera 1000.

Given that the photographing magnification is represented by letter M, it is calculated as follows.

$$M = D/f,$$

where, D represents a distance, and f represents the focal length. From the above equation, the photographing magnification APEX value Mv is calculated as follows.

$$Mv = Dv - fv = Dv/2 + 10 - fv,$$

where, fv represents an APEX value of the focal length, which is indicated in FIG. 15B. In order to cancel the extra amount which has been introduced when the photographing distance APEX value Dv is standardized, +10 is added. FIG. 15A indicates the photographing magnification APEX values Mv.

Then, in S32, based on data retrieved from the lens ROM 11 or the code plate of the photographing lens 2, it is judged wither a macro photographing is to be executed. If the photographing lens 2 is a macro lens (S32: YES), it is determined so based on the data read from the lens ROM 11. If the photographing lens 2 is a zoom lens or the like capable of photographing in the macro mode (S32: YES), it is determined so based on the data from the code plate of the photographing lens 2. When the macro photographing is executed, the photographing distance is very short, and the photographing magnification is relatively large. Therefore, in such a case, the photometry sensor 12 easily receives light reflected by the object. In this case, a light source flag LSC·f, which represents whether the photometry sensor 12 receives the light from the external light source as well as the light reflected by the object (LSC·f=1) or the photometry sensor 12 receives only the light from the external light source (LSC·f=0), is set to 1 (S36).

If the macro photographing is not executed (S32: NO), it is judged whether the photographing distance APEX value Dv is equal to or less than 0, i.e., whether the photographing distance is closer than 0.83 m (which is an intermediate point between 1 m and 0.7 m) in S33. If the photographing distance APEX value Dv is less than 0 (S33: YES), the light source flag LSC·f is set to 1 (S36). If the photographing distance APEX value Dv is equal to or greater than 0 (S33: NO), it is judged whether the photographing magnification APEX value Mv is smaller than 4, i.e., whether the photographing magnification is greater than ⅛ (S34). If the photographing magnification APEX value Mv is less than 4 (S34: YES), the light source flag LSC·f is set to 1 (S36). If the photographing magnification APEX value Mv is equal to or greater than 4 (S34: NO), the light source flag LSC·f is set to 0 (S35).

With the above procedure, when the photographing mode is not the macro mode, the photographing distance is greater than 0.83 m, and the photographing magnification is greater than ⅛, then it is judged that the effect of the external light source on the object should be taken into account, and the light source flag LSC·f is set to 0 (S35). It should be noted that, although in this embodiment, judgment is made at S32, S33 and S34, only one may be employed to improve the performance.

FIGS. 16 and 17 show a flowchart illustrating the "light source compensation procedure" called at S22 of FIG. 13.

In the embodiment, when the initial Bvd value, which has been set at S21, of the photometry sensors 9 is determined, a predetermined light source (light source A) for adjustment is used. When a photographing is to be executed, the Bvd should be compensated in accordance with the actually used light source, for example, the sun light. In the procedure shown in FIGS. 16 and 17, relative compensation values of B (blue) and R (red) components with respect to the value for the green component are obtained. Further, in this procedure, compensation values for removing the effects of the light source illuminating the object are also determined.

In S140, the light source flag LSC·f is examined. If the light source flag LSC·f is equal to 0 (S140: NO), the photographing distance is equal to or greater than a predetermined distance, and the photographing magnification is equal to or less than a predetermined magnification, the photometry sensor 12 is capable of measure the external light source correctly. In such a case, control proceeds to S141, and compensation values are calculated.

Specifically, for the color components G, B and R, the brightness data Bvd·wb(0), Bvd·wb(1), and Bvd·wb(2), which are obtained by the photometry sensor 12 (FIG. 10, S113), are retrieved (S141). Then, a light source adjustment value adj·sun·b for the photometry sensor 9B and a light source adjustment value adj·sun·r for the photometry sensor 9R with respect to the value for G component are read from the EEPROM 26 (S142, S142A). In the embodiment, the light source adjustment values are as follows.

$adj \cdot sun \cdot b = +8$ $adj \cdot sun \cdot r = -4$

It should be noted that, if the adjustment of the sensors 9 is executed using the sun light instead of the predetermined light source A, the light source adjustment values are all zero.

Then, based on the brightness data and the light source adjustment values, a light source compensation value light·gb for the photometry sensor 9B is obtained as follows (S143).

$light \cdot gb = Bvd \cdot wb(0) - Bvd \cdot wb(1) + adj \cdot sun \cdot b$

Similarly, a light source compensation value light·gr for the photometry sensor 9R is obtained as follows (S144).

$light \cdot gr = Bvd \cdot wb(0) - Bvd \cdot wb(2) + adj \cdot sun \cdot r$

If the light source flag LSC·f is equal to 1 (S140: YES), i.e., the photographing distance is less than the predetermined distance, or the photographing magnification is greater than the predetermined magnification, the photometry sensor 12 cannot measure the external light source correctly. In such a case, control proceeds to S145, and the compensation values are determined based on predetermined fixed data.

Specifically, for the components G, B and R, light source data Bvd·light·g, Bvd·light·b and Bvd·light·r are retrieved from the EEPROM 26 of the controller 20 (S145). Then, similarly to the procedure in S142, the light source adjustment value adj·sun·b for the photometry sensor 9B and the light source adjustment value adj·sun·r for the photometry sensor 9R with respect to the value for G component are read from the EEPROM 26 (S146, S146A). It should be noted that, if adjustment of the photometry sensors 9 has been performed using the sun light or the equivalent but not the A-source, the light source adjustment values are zero.

Then, based on the light source data and the light source adjustment values, the light source compensation value light·gb for the photometry sensor 9B is obtained as follows (S147).

$light \cdot gb = Bvd \cdot light \cdot g \cdot Bvd \cdot light \cdot b + adj \cdot sun \cdot b$ Similarly, the light source compensation value light·gr for the photometry sensor 9R is obtained as follows (S148).

$light \cdot gr = Bvd \cdot light \cdot g \cdot Bvd \cdot light \cdot r + adj \cdot sun \cdot r$ The compensation values light·gb and light·gr obtained in the procedure shown in FIG. 16 have values dependent on the spectral characteristic of the external light source, and will be referred to as light·gb(x) and light·gr(x). The compensation values light·gb and light·gr obtained in the procedure shown in FIG. 17 are fixed values, which are not dependent on the characteristic of the external light source, which may be referred to as light·gb(s) and light·gr(s). Normally, the compensation values light·gb(x) and light·gr (x) are different from light·gb(s) and light·gr(s), respectively. In the above-described embodiment, one of the values dependent on the characteristic of the light source or those independent thereon are selected in accordance with the photographing distance and magnification if the camera 1000 does not operate in the macro mode. However, in practice, there is no critical condition for restricting the compensation values to be used. Rather, the effects of the object color on the photometry sensor changes gradually. Therefore, it may be convenient to average or weighted-average the compensation values light·gb(x) and light·gb(s), and the compensation values light·gr(x) and light·gr(s).

FIG. 18 is a flowchart illustrating the "light source difference compensation procedure", which is called at S23 in FIG. 13. In this procedure, based on the light source compensation values for light·gb and light·gr, obtained at S22, the light source compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B, the following calculation is executed.

$$Bvd·b(i)=Bvd·b(i)+\text{light·gb}.$$

At S152, for each photometry area of the photometry sensor 9R, the following calculation is executed.

$$Bvd·r(i)=Bvd·r(i)+\text{light·gr}.$$

With the above compensation, the photometry sensors 9G, 9B and 9R has the same photometric characteristics for a predetermined reference light source such as the sun light.

The light source compensation will be described in further detail.

Figure 19A:
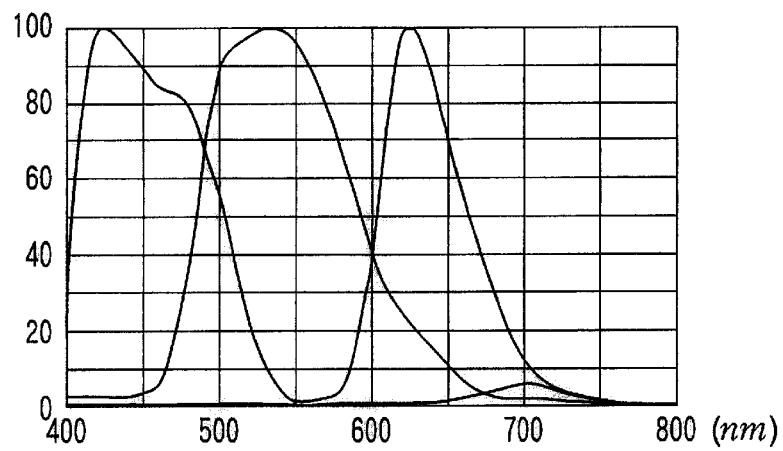
Figure 19B:
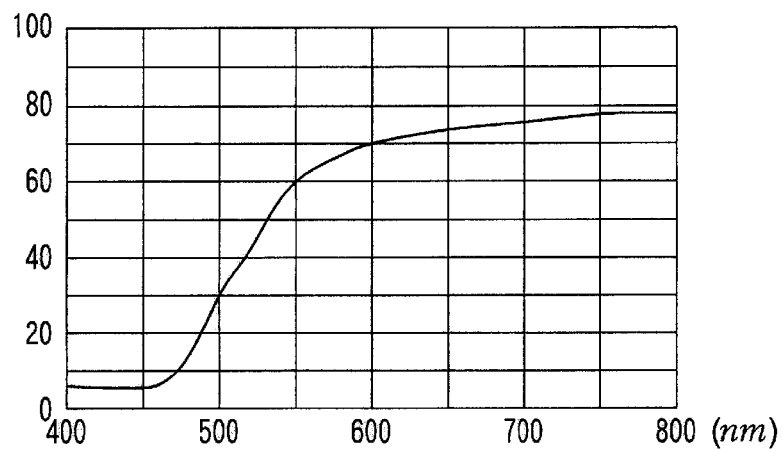
Figure 19C:
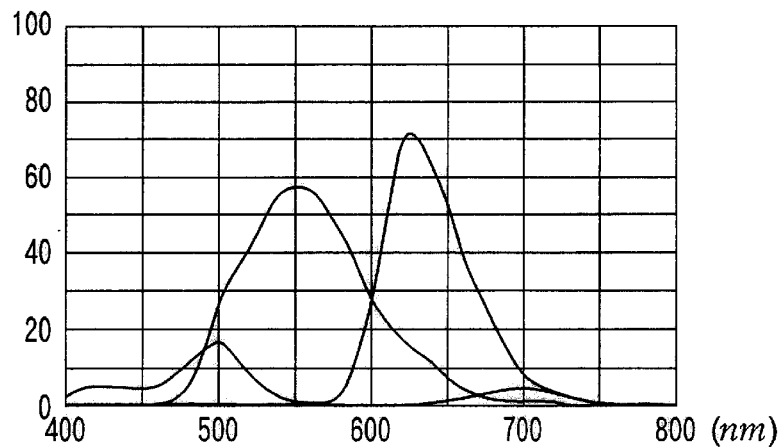

FIG. 19A shows an example of spectral sensitivity characteristics of the photometry sensors 9B, 9g and 9R. In the drawing, the characteristics are normalized, i.e., the peak of each characteristic is represented by 100. Given that the object color is yellow, then the spectral reflectivity may be represented by a curve indicated in FIG. 19B. If such an object is measured using the sensors 9B, 9G and 9R, the outputs are represented by curves shown in FIG. 19C. In FIG. 19C, since the output of the sensor 9B is low, the color is determined to be yellow in the colorimetry procedure.

Figure 19D:
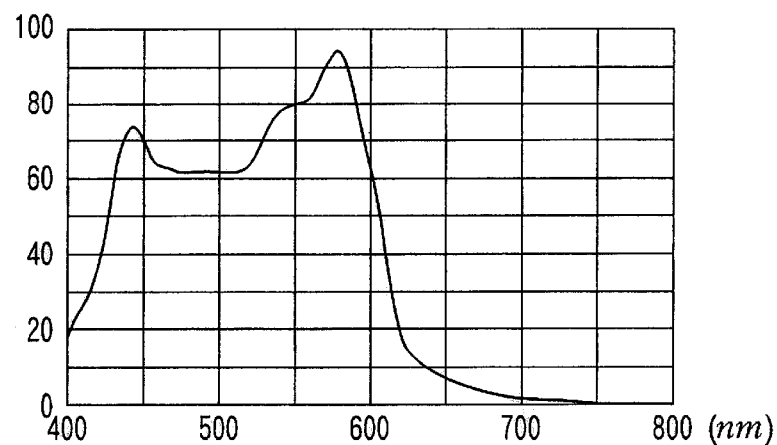

Next, it is assumed that a fluorescent lamp is used as a light source. FIG. 19D shows an example of the spectral radiant characteristic of the fluorescent lamp. If the fluorescent lamp is used for illuminating the same object, the outputs of the sensors 9B, 9G and 9R are represented by curves shown in FIG. 19E. In this example, only the output of the sensor 9G has a larger value than the other, the color of the object will be determined to be green in the colorimetry procedure, although the actual object color is yellow.

Figure 19E:
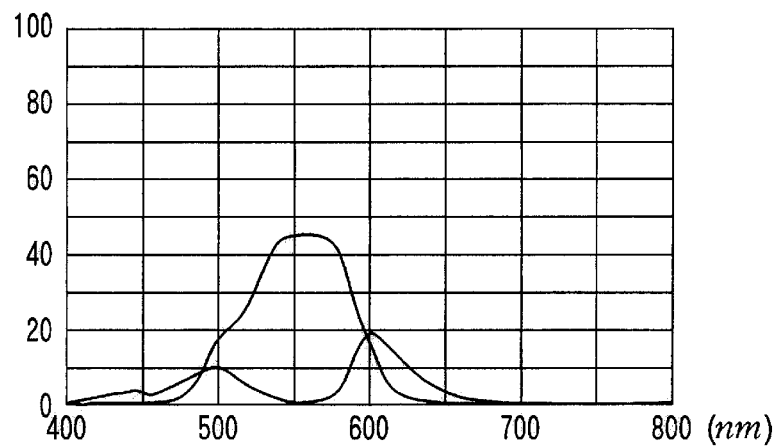
Figure 19F:
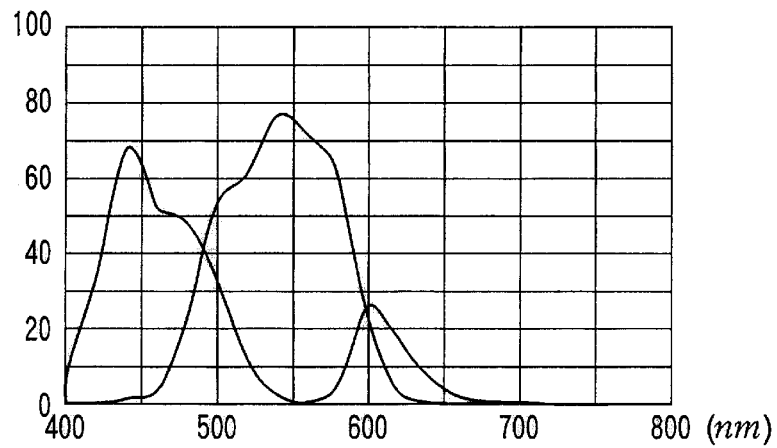

If the light source is measured using the sensor 12 which exhibits the spectral sensitivity characteristics similar to those shown in FIG. 19A, the outputs of the sensor 12 are represented by curves shown in FIG. 19F. If the outputs of the sensors 9B, 9G and 9R shown in FIG. 19E are compensated using the outputs of the sensor 12 shown in FIG. 19F, the compensated outputs will have the curves similar to those shown in FIG. 19C. That is, the affect of the color of the light source can be removed, and the colorimetry can be performed accurately.

FIG. 20 is a flowchart illustrating the "colorimetric parameter calculation procedure", which is called at S24 of FIG. 13. In this procedure, colorimetric parameters used in the colorimetric judging are calculated. As the colorimetric parameters, parameters Gf(i) for G component, parameters Bf(i) for B component, and parameters Rf(i) for R component are calculated (S161, S162 and S163) according to the following formulae.

$$Gf(i)=Bvd·g(i)-\{Bvd·b(i)+Bvd·r(i)\}/2;$$

$$Bf(i)=Bvd·b(i)-\{Bvd·g(i)+Bvd·r(i)\}/2;$$

and $$Rf(i)=Bvd·r(i)-\{Bvd·b(i)+Bvd·g(i)\}/2.$$

FIG. 21 is a flowchart illustrating the colorimetric constant setting procedure, in which the colorimetric constants are read from the EEPROM 26. The colorimetric constants include:

threshold values for color judgment: THvalue.*1(i);

coefficients for color judgment: coefficient·#1(i) and coefficient·#2(i);

coefficients for calculating colorimetric compensation values: CCcoefficient·*1(i);

adjustment values for calculating the colorimetric compensation values: CCadjestment·*1(i).

In the above indication, a symbol * represents g (green), b (blue), r (red), m (magenta), y (yellow) or c (cyan), and a symbol # represents g (green), b (blue) or r (red). In this procedure, for all the photometry areas A0–A5 of the sensors 9, the colorimetric constants are set, respectively. Therefore, at S171, i is set to zero (0), and then, if i≦5 (S172: YES), the constants are read from the EEPROM (S173, S174, S175 and S176). Then, at S177, i is incremented by one, and control returns to S172. Thus, for i=0 through 5, steps S173–S176 are repeated. The constants read from the EEPROM 26 are stored in the RAM 27 of the controller 20. FIG. 22 shows an example of the constants read from the EEPROM 26.

FIGS. 23 and 24 show a flowchart illustrating the "color judgment procedure". The procedure judges the color for each of the photometry areas A0–A5 of the photometry sensors 9G, 9B and 9R, and determines the color of the object for each photometry area A0–A5.

At S181, i is set to 0. Then, if i≦5 (S182: YES), the following steps are repeated. In the following description, Color(i) represents color parameters, Color·max(i) and Color·min(i) represent color judgment parameters, respectively.

At S183, the color parameter Color(i) is set to colorless. Then, at S184, Rf(i) and THvalue·c1(i) are compared.

If Rf(i)<THvalue·c1(i) (S184:YES), |Bf(i)−Gf(i)| and |coefficient·r1(i)×Rf(i)| are compared (S185).

If |Bf(i)−Gf(i)|<|coefficient·r1(i)×Rf(i)| (S185:YES), Color·min(i) is set to Rf(i) (S186).

If Rf(i)≧THvalue·c1(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<|coefficient·g1(i)×Gf(i)| (S188:YES), Color·min(i) is set to Gf(i) (S189).

If Gf(i)>THvalue·m1(i) (S187:NO) or |Bf(i)−Rf(i)|≧|coefficient·g1(i)×Gf(i)| (S188:NO), step S189 is skipped.

At S190, Gf(i) is compared with THvalue·g1(i).

If Gf(i)>THvalue·g1(i) (S190:YES), |Bf(i)−Rf(i)| and |coefficient·g2(i)×Gf(i)| are compared (S191).

If |Bf(i)−Rf(i)|<|coefficient·g2(i)×Gf(i)| (S191:YES), Color·max(i) is set to Gf(i) (S192).

If Gf(i)≦THvalue·g1(i) (S190:NO) or |Bf(i)−Rf(i)|≧|coefficient·g2(i)×Gf(i)| (S191:NO), step S192 is skipped.

At S193, Bf(i) is compared with THvalue·b1(i).

If Bf(i)>THvalue·b1(i) (S193:YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i) ≦THvalue·b1(i) (S193:NO) or |Gf(i)−Rf(i)|≧|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (S198). If Rf(i) ≦THvalue·r1(i) (S196:NO) or |Bf(i)−Gf(i)|≧|coefficient·r2(i)×Rf(i)| (S197:NO), step S198 is skipped.

At S199, Bf(i) is compared with THvalue·y1(i).

If Bf(i)<THvalue·y1(i) (S199:YES), |Gf(i)−Rf(i)| and |coefficient·b1(i)×Bf(i)| are compared (S200).

If |Gf(i)−Rf(i)|<|coefficient·b1(i)×Bf(i)| (S200:YES), Color·min(i) is set to Bf(i) (S201). If Bf(i)>THvalue·y1(i) (S199:NO) or |Gf(i)−Rf(i)|≧|coefficient·b1(i)×Bf(i)| (S200:NO), step S201 is skipped.

During the above steps, for each of the photometry areas A0–A5, color·max(i) and color·min(i) are obtained.

At S202, color·min(i) and Rf(i) are compared. If color·min(i) is equal to Rf(i) (S202:YES), color(i) is set to cyan (S203). If color·min(i) is not equal to Rf(i), color·min (i) and Gf(i) are compared at S204. If color·min(i) is equal to Gf(i) (S204:YES), color(i) is set to magenta (S205). If color·min(i) is not equal to Gf(i), color·max(i) and Gf(i) are compared at S206. If color·max(i) is equal to Gf(i) (S206:YES), color(i) is set to green (S207). If color·max(i) is not equal to Gf(i) (S206:NO), then color·max(i) and Bf(i) are compared at S208. If color·max(i) is equal to Bf(i), color(i) is set to blue (S209). If color·max(i) is not equal to Bf(i) (S208:NO), then color·max(i) is compared with Rf(i) at S210. If color·max(i) is equal to Rf(i) (S210:YES), then color(i) is set to red (S211). If color·max(i) is not equal to Rf(i) (S210:NO), then color·min(i) is compared with Bf(i) at S212. If color·min(i) is equal to Bf(i) (S212:YES), color(i) is set to yellow (S213), and control proceeds to S214. If color·min(i) is not equal to Bf(i) (S212:NO), step S213 is skipped, and control proceeds to S214, where i is incremented by one. Then, control proceeds to S182. As a result of the above-described procedure, yellow has the highest priority, and in the foregoing steps, the color finally selected in accordance with the conditions is determined as the color of the photometry area.

FIG. 25 is a flowchart illustrating an example of the "area colorimetric compensation value calculating procedure", which is called at S27 of the colorimetry procedure in FIG. 13.

In this procedure, the colorimetric compensation values CC(i) corresponding to the difference of the color among the photometry areas are calculated. In the example shown in FIG. 22, the compensation values CC(i) are determined by selecting values from among predetermined values.

At S221, i is set to an initial value of zero. At S222, it is judged whether i is smaller than five. If i is 0, 1, 2, 3, 4 or 5, (S222:YES), it is judged whether color(i) is colorless (S223). If color(i) is colorless (S223:YES), CC(i) is set to zero (S224). If color(i) is not colorless (S223:NO), step S224 is skipped. At S225, it is judged whether color(i) is cyan. If color(i) is cyan (S225:YES), the colorimetric compensation value CC(i) is calculated as follows at S241.

$$CC(i)=CC\text{coefficient·}c1(i)\times\{Rf(i)-TH\text{value·}c1(i)\}+CC\text{adjustment·}c1(i).$$

If color(i) is not cyan (S225:NO), then step S241 is skipped. At S227, it is judged whether color(i) is magenta. If color(i) is magenta (S227:YES), the colorimetric compensation value CC(i) is calculated as follows at step S242.

$$CC(i)=CC\text{coefficient·}m1(i)\times\{Gf(i)-TH\text{value·}m1(i)\}+CC\text{adjustment·}m1(i).$$

If color(i) is not magenta (S227:NO), then step S242 is skipped. At S229, it is judged whether color(i) is green. If color(i) is green (S229:YES), the colorimetric compensation value CC(i) is calculated as follows at step S243.

$$CC(i)=CC\text{coefficient·}g1(i)\times\{Gf(i)-TH\text{value·}g1(i)\}+CC\text{adjustment·}g1(i).$$

If color(i) is not green (S229:NO), then step S243 is skipped. At S231, it is judged whether color(i) is blue. If color(i) is blue (S231:YES), the colorimetric compensation value CC(i) is calculated as follows at step S244.

$$CC(i)=CC\text{coefficient·}b1(i)\times\{Bf(i)-TH\text{value·}b1(i)\}+CC\text{adjustment·}b1(i).$$

If color(i) is not blue (S231:NO), then step S244 is skipped. At S233, it is judged whether color(i) is red. If color(i) is red (S233:YES), the calorimetric compensation value CC(i) is calculated as follows at step S245.

$$CC(i)=CC\text{coefficient·}r1(i)\times\{Rf(i)-TH\text{value·}r1(i)\}+CC\text{adjustment·}r1(i).$$

If color(i) is not red (S233:NO), then step S245 is skipped. At S235, it is judged whether color(i) is yellow. If color(i) is yellow (S235:YES), the colorimetric compensation value CC(i) is calculated as follows at step S246.

$$CC(i)=CC\text{coefficient·}y1(i)\times\{Bf(i)-TH\text{value·}y1(i)\}+CC\text{adjustment·}y1(i)$$

If color(i) is not yellow (S235:NO), then step S246 is skipped. Then, at S237, i is incremented by one, and control returns to S222.

FIG. 26 is a flowchart illustrating a "CC calculating procedure", which is called at S28 of the colorimetry procedure in FIG. 13.

At S251, in accordance with the calorimetric compensation value CC(i) for each photometry area, a colorimetric compensation value CC for all of the photometry areas by averaging, center-weighted averaging, or adopting of the maximum value.

When the averaging is performed, the compensation value CC is calculated as follows.

$$CC=\{CC(0)+CC(1)+CC(2)+CC(3)+CC(4)+CC(5)\}/6$$

The center-weighted averaging is a weighted averaging procedure, in which the central area is weighted, and the compensation value CC is calculated as follows.

$$CC=\{CC(0)\times 4+CC(5)+(CC(1)+CC(2)+CC(3)+CC(4)\times\text{¾})/8$$

When the maximum value is used as the compensation value CC, the compensation value CC is represented by the following formula.

$$CC=\max\{CC(0),\ CC(1),\ CC(2),\ CC(3),\ CC(4),\ CC(5)\}$$

As above, in the colorimetry procedure, the calorimetric compensation value CC can be obtained. Using the compensation value CC, the exposure value Lvd is compensated to obtain the final exposure value Lvd.

Then, in accordance with the exposure value Lvd, the exposure control device controls the exposure operation of the camera. With this configuration, regardless of the color of the object, in other words, regardless of the reflectivity of the object, an appropriate exposure value can always be obtained. In particular, when the object color is determined to be yellow, the exposure compensation value is determined to increase the exposure value, and when the object color is determined to be blue, the exposure compensation value is determined to decrease the exposure value. With this configuration, errors in determining the exposure value when such objects are photographed, which has been desired to be solved, can be resolved.

Further, since each photometry sensor is configured to have a plurality of photometry areas, and the exposure values and the compensation values are determined in accordance with the measured values at the plurality of photometry areas, an appropriate exposure compensation value can be determined when the entire object has a predetermined color, or when the object includes a plurality of portions having different colors.

Still further, the effects of the light reflected by the object on the photometry sensor is judged. That is, when the macro mode is set, when the object distance is smaller than a predetermined distance, or when the photographing magnification is greater than a predetermined value, it is judged that the light reflected by the object has some effect on the measurement by the photometry sensor, and in such a case, a predetermined fixed value is used as the compensation value. With this configuration, under various conditions, an appropriate exposure compensation value can be obtained.

It should be emphasized that, in the above-described embodiment, the photometry sensor 12, and the photometry sensors 9G, 9B and 9R utilize the same photo diodes, and the green, blue and red filters provided to the sensors 9G, 9B and 9R, and the filters provided to the areas A0–A2 of the photometry sensor 12 have the same spectral transmissivity characteristics. In other words, the photometry sensors 9G, 9B and 9R and the areas A0–A2 of the photometry sensor 12 have substantially the same spectral sensitivity characteristics. Therefore, the spectral differences between the outputs of the sensor 12 and the outputs of the sensors 9G, 9B and 9R can be substantially avoided, and the compensation related to the light source can be made at high accuracy. Accordingly, an appropriate exposure can be performed.

Figure 3B:
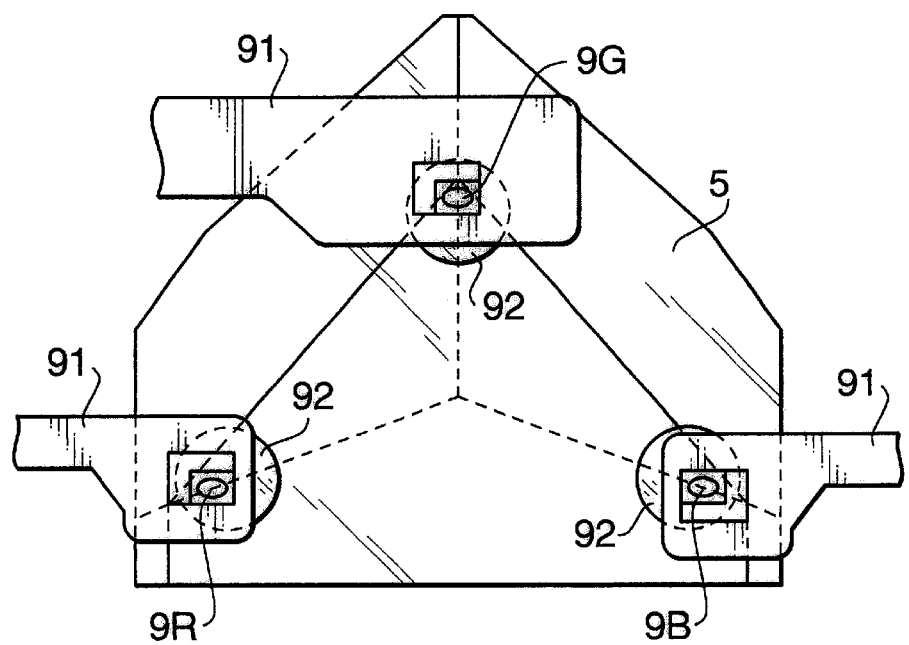
FIG. 3B shows an alternative arrangement of photometry sensors.

In the above-described embodiment, the sensor 9D for the normal light is provided in addition to the sensors 9B, 9G and 9R for B, G and R color components. The light receiving characteristics of the sensor G has a peak at the wavelength of 540 nm. This characteristic is close to that of the sensor 9D. Therefore, in another embodiment of the invention, the sensor 9G is used instead of the sensor 9D, and the sensor 9D is omitted, as shown in FIG. 3B. In such a case, in steps S11–S15 of the main procedure (FIG. 8), the output Bvad·g of the sensor 9G is used as Bvad, and the calculation is to be executed.

With such a structure, since the number of sensors is reduced, the manufacturing cost can be reduced. Further, a space necessary for arranging the sensors can be reduced, which enables downsizing of the camera body. In the case of FIG. 3B, since the sensor 9G is arranged at the upper central portion on the eyepiece optical system side of the pentagonal prism, photometry can be done accurately.

In the above-described embodiment, the exposure value Lvd is compensated. However, the invention is not limited to the procedure described above. For example, the procedure can be modified such that the colorimetry procedure (S16) is executed before the exposure value calculation procedure (S15), the values Bvd(i) are compensated by adding the calorimetric compensation values CC(i), and then, using the compensated values Bvd(i), the procedure of S15 is executed.

The present disclosure relates to the subject matters contained in Japanese Patent Applications No.2000-131938, filed on May 1, 2000, and No. 2000-239412, filed on Aug. 8, 2000, which are expressly incorporated herein by reference in their entireties.

What is claimed is:

1. A photometry device for a camera, comprising:

a normal light sensor that performs photometry with respect to an object;

an exposure amount determining system that determines an exposure amount of the object in accordance with an output of said normal light sensor;

a plurality of colorimetric sensors that detect a color of the object by performing colorimetry with respect to an image of the object which is formed by a photographing lens of the camera, said plurality of colorimetric sensors having spectral sensitivity characteristics that are different from each other;

an external light sensor that measures an external light illuminating the object at spectral sensitivity characteristics respectively corresponding to said plurality of colorimetric sensors;

a light source color compensation amount determining system that determines light source color compensation amount in accordance with the output of said external light sensor;

a light source effect compensation system that compensates for the outputs of said colorimetric sensors with the light source color compensation amount;

a colorimetry compensation amount determining system that determines a color of the object based on the output of said calorimetric sensors as compensated by said light source effect compensation system, and then determines a calorimetric compensation amount based on the determined color;

an exposure amount compensation system that compensates for the exposure amount determined by said exposure amount determining system in accordance with the colorimetric compensation amount, wherein said light source color compensation amount determining system changes the light source color compensation amount in accordance with an object distance.

2. The photometry device according to claim 1, wherein a predetermined fixed value is used as said light source color compensation amount if the object distance is smaller than a predetermined fixed distance.

3. The photometry device according to claim 2, wherein light source data corresponding to the output of said light source photometry system is stored in a storing system, and wherein said fixed value is obtained in accordance with the data stored in said storing system.

4. The photometry device according to claim 2, wherein a condition where the object distance is smaller than a predetermined fixed distance includes a macro photographing mode of said camera.

5. The photometry device according to claim 1, wherein a value intermediate the light source color compensation amount as determined by the light source color compensation amount determining system and a predetermined fixed value is used as said light source color compensation amount if the object distance is smaller than a predetermined fixed distance.

6. The photometry device according to claim 5, wherein light source data corresponding to the output of said light source photometry system is stored in a storing system, and wherein said fixed value is obtained in accordance with the data stored in said storing system.

7. The photometry device according to claim 5, wherein a condition where the object distance is smaller than a predetermined fixed distance includes a macro photographing mode of said camera.

8. The photometry device according to claim 1, wherein said normal light sensor and said plurality of calorimetric sensors meters light reflected by the object and passed through an optical system of said camera, and wherein said external light sensor receives light which is not passed through the optical system of said camera.

9. The photometry device according to claim 1,
wherein said normal light sensor includes a normal light photometry sensor, the spectral sensitivity characteristic of which has a peak sensitivity at a wavelength within a range from 500 nm through 600 nm,
wherein said plurality of calorimetric sensors include a blue light photometry sensor for metering blue light component, a green light photometry sensor for metering green light component, and a red light photometry sensor for metering red light component, and
wherein said external light sensor includes a photometry sensor having photometry areas for metering blue, green and red light components, respectively.

10. The photometry device according to claim 9, wherein said light source effect compensation system compensates for at least two of the outputs of said calorimetric sensors corresponding to three primary colors of green, blue and red in accordance with the light source color compensation amount.

11. The photometry device according to claim 10, wherein said plurality of colorimetric sensors and said normal light sensor include photometric elements having the same photometric characteristics.

12. The photometry device according to claim 11, wherein said green light sensor is used as said normal light sensor, the output of said green light sensor being used as the output of said normal light sensor.

13. The photometry device according to claim 1, wherein each of said normal light sensor and said plurality of colorimetry sensors has divided photometry areas, said exposure amount determining system and exposure compensation amount determining system determining the exposure amount and the exposure compensation amount in accordance with the output of each of said divided photometry areas.

14. The photometry device according to claim 13, wherein said colorimetric compensation amount determining system judges the color of the object at each of said divided photometry areas, determines the colorimetric compensation amount for each of said divided photometry areas, and determines a colorimetric compensation amount with respect to an entire object based on the colorimetric compensation amounts for said divided photometry areas.

15. The photometry device according to claim 13, wherein said calorimetric compensation amount determining system determines a colorimetric compensation amount for each of said divided photometry areas, and adds a colorimetric compensation amount for each of said photometry areas to the photometry output for each of said divided photometry areas.

16. A photometry device for a camera, comprising:
a normal light sensor that performs photometry with respect to an object;
an exposure amount determining system that determines an exposure amount of the object in accordance with an output of said normal light sensor;
a plurality of calorimetric sensors that detect a color of the object by performing colorimetry with respect to an image of the object which is formed by a photographing lens of the camera, said plurality of calorimetric sensors having spectral sensitivity characteristics that are different from each other;
an external light sensor that measures an external light illuminating the object at spectral sensitivity characteristics respectively corresponding to said plurality of colorimetric sensors;
a light source color compensation amount determining system that determines light source color compensation amount in accordance with the output of said external light sensor;
a light source effect compensation system that compensates for the outputs of said colorimetric sensors with the light source color compensation amount;
a colorimetry compensation amount determining system that determines a color of the object based on the output of said colorimetric sensors as compensated by said light source effect compensation system, and then determines a calorimetric compensation amount based on the determined color;
an exposure amount compensation system that compensates for the exposure amount determined by said exposure amount determining system in accordance with the calorimetric compensation amount,
wherein said light source color compensation amount determining system changes the light source color compensation amount in accordance with a photographing magnification of the photographing lens of said camera.

17. The photometry device according to claim 16, wherein a predetermined fixed value is used as said light source color compensation amount if said photographing magnification exceeds a predetermined photographing magnification range.

18. The photometry device according to claim 17, wherein light source data corresponding to the output of said light source photometry system is stored in a storing system, and wherein said fixed value is obtained in accordance with the data stored in said storing system.

19. The photometry device according to claim 17, wherein a condition where said photographing magnification exceeds a predetermined photographing magnification range includes a macro photographing mode of said camera.

20. The photometry device according to claim 16, wherein a value intermediate between the light source color compensation amount as determined by the light source color compensation amount determining system and a predetermined fixed value is used as said light source color compensation amount if said photographing magnification exceeds a predetermined photographing magnification range.

21. The photometry device according to claim 20, wherein light source data corresponding to the output of said light source photometry system is stored in a storing system, and wherein said fixed value is obtained in accordance with the data stored in said storing system.

22. The photometry device according to claim 20, wherein a condition where said photographing magnification exceeds a predetermined photographing magnification range includes a macro photographing mode of said camera.

23. The photometry device according to claim 16, wherein said normal light sensor and said plurality of calorimetric sensors meters light reflected by the object and passed through an optical system of said camera, and wherein said external light sensor receives light which is not passed through the optical system of said camera.

24. The photometry device according to claim 16,
wherein said normal light sensor includes a normal light photometry sensor, the spectral sensitivity characteristic of which has a peak sensitivity at a wavelength within a range from 500 nm through 600 nm,
wherein said plurality of colorimetric sensors include a blue light photometry sensor for metering blue light component, a green light photometry sensor for metering green light component, and a red light photometry sensor for metering red light component, and
wherein said external light sensor includes a photometry sensor having photometry areas for metering blue, green and red light components, respectively.

25. The photometry device according to claim 24, wherein said light source effect compensation system compensates for at least two of the outputs of said colorimetric sensors corresponding to three primary colors of green, blue and red in accordance with the light source color compensation amount.

26. The photometry device according to claim 25, wherein said plurality of colorimetric sensors and said normal light sensor include photometric elements having the same photometric characteristics.

27. The photometry device according to claim 26, wherein said green light sensor is used as said normal light sensor, the output of said green light sensor being used as the output of said normal light sensor.

28. The photometry device according to claim 16, wherein each of said normal light sensor and said plurality of colorimetry sensors has divided photometry areas, said exposure amount determining system and exposure compensation amount determining system determining the exposure amount and the exposure compensation amount in accordance with the output of each of said divided photometry areas.

29. The photometry device according to claim 28, wherein said colorimetric compensation amount determining system judges the color of the object at each of said divided photometry areas, determines the calorimetric compensation amount for each of said divided photometry areas, and determines a colorimetric compensation amount with respect to an entire object based on the colorimetric compensation amounts for said divided photometry areas.

30. The photometry device according to claim 28, wherein said colorimetric compensation amount determining system determines a colorimetric compensation amount for each of said divided photometry areas, and adds a calorimetric compensation amount for each of said photometry areas to the photometry output for each of said divided photometry areas.

* * * * *